(12) United States Patent
Wang et al.

(10) Patent No.: US 11,606,292 B2
(45) Date of Patent: *Mar. 14, 2023

(54) ROUTE PROCESSING METHOD, DEVICE, AND SYSTEM

(71) Applicant: Huawei Technologies Co., Ltd., Shenzhen (CN)

(72) Inventors: Haibo Wang, Beijing (CN); Dapeng Chen, Beijing (CN); Shunwan Zhuang, Beijing (CN)

(73) Assignee: HUAWEI TECHNOLGOIES CO., LTD., Shenzhen (CN)

(*) Notice: Subject to any disclaimer, the term of this patent is extended or adjusted under 35 U.S.C. 154(b) by 63 days.

This patent is subject to a terminal disclaimer.

(21) Appl. No.: 17/246,063

(22) Filed: Apr. 30, 2021

(65) Prior Publication Data
US 2021/0250294 A1 Aug. 12, 2021

Related U.S. Application Data

(63) Continuation of application No. 16/567,589, filed on Sep. 11, 2019, now Pat. No. 11,012,355, which is a (Continued)

(30) Foreign Application Priority Data

Mar. 14, 2017 (CN) .......................... 201710151473.5

(51) Int. Cl.
H04L 45/74 (2022.01)
H04L 12/46 (2006.01)

(52) U.S. Cl.
CPC .......... *H04L 45/74* (2013.01); *H04L 12/4633* (2013.01); *H04L 12/4641* (2013.01)

(58) Field of Classification Search
CPC ......... H04L 45/74; H04L 45/16; H04L 45/50; H04L 12/4633; H04L 12/4641; H04L 12/465; H04L 12/4683
See application file for complete search history.

(56) References Cited

U.S. PATENT DOCUMENTS 10,142,129 B1 * 11/2018 Gupta .................... H04L 45/66
10,476,796 B2   11/2019 Gao et al.
(Continued)

FOREIGN PATENT DOCUMENTS

CN    103580980 A    2/2014
CN    104702476 A    6/2015
(Continued)

OTHER PUBLICATIONS

Eastlake, D., et al., "EVPN All Active Usage Enhancements," draft-eastlake-bess-evpn-vxlan-bypass-vlep-00, Mar. 5, 2018, 10 pages.
(Continued)

*Primary Examiner* — Robert C Scheibel
(74) *Attorney, Agent, or Firm* — Conley Rose, P.C.

(57) ABSTRACT

A route processing method, a device, and a system, where the method includes: a network virtualization edge (NVE) device set including at least two NVE devices includes a common Virtual Extensible Local Area Network (VXLAN) Tunnel Endpoint (VTEP) address. The common VTEP address is used to identify a common VTEP, and the common VTEP is deployed on each NVE device in the NVE device set. In addition, each NVE device in the NVE device set includes a VTEP address, and the VTEP address is used to identify a VTEP included in a corresponding NVE device. An NVE device in the NVE device set establishes a VXLAN tunnel between the NVE devices in the NVE device set
(Continued)

based on a VTEP address and the common VTEP address using an inclusive multicast Ethernet tag (IMET) route.

26 Claims, 14 Drawing Sheets

Related U.S. Application Data continuation of application No. PCT/CN2017/111608, filed on Nov. 17, 2017.

(56) References Cited

U.S. PATENT DOCUMENTS

| | | | |
|---|---|---|---|
| 2013/0117449 A1* | 5/2013 | Hares | H04L 45/04 709/225 |
| 2014/0086253 A1* | 3/2014 | Yong | H04L 49/70 370/395.53 |
| 2015/0003458 A1* | 1/2015 | Li | H04L 45/507 370/392 |
| 2015/0188769 A1 | 7/2015 | Gu | |
| 2016/0119156 A1 | 4/2016 | Drake et al. | |
| 2016/0134513 A1 | 5/2016 | Yang et al. | |
| 2016/0248601 A1 | 8/2016 | Nomi | |
| 2016/0277210 A1 | 9/2016 | Lin et al. | |
| 2017/0019331 A1 | 1/2017 | Yong | |
| 2017/0331641 A1* | 11/2017 | Fu | H04L 12/4679 |

FOREIGN PATENT DOCUMENTS

| | | |
|---|---|---|
| CN | 105591868 A | 5/2016 |
| CN | 105591982 A | 5/2016 |
| CN | 105991432 A | 10/2016 |
| CN | 106209553 A | 12/2016 |
| EP | 3013006 A1 | 4/2016 |
| WO | 2016154401 A1 | 9/2016 |

OTHER PUBLICATIONS

Sajassi, A., Ed., et al., "BGP MPLS-Based Ethernet VPN," RFC 7432, Feb. 2015, 56 pages.

Sajassi, A., et al., "A Network Virtualization Overlay Solution using EVPN," draft-ietf-bess-evpn-overlay-07, XP015116866, Dec. 1, 2016, 28 pages.

* cited by examiner

CONT.
FROM
FIG. 2A

CONT.
FROM
FIG. 2A

S104. When determining that the common VTEP address included in the originating router's IP address field in the second IMET route is the same as the common VTEP address stored in the first NVE device, the first NVE device establishes a VXLAN tunnel from the first NVE device to the second NVE device based on the second VTEP address in the second IMET route S105. Send a first IMET route to the second NVE device, where an originating router's IP address field in the first IMET route carries the common VTEP address stored in the first NVE device, the first IMET route further includes a first VTEP address, the first VTEP address is used by the second NVE device to establish a VXLAN tunnel from the second NVE device to the first NVE device, and the common VTEP address stored in the first NVE device is different from the first VTEP address First IMET route

FIG. 2B

| 0 | | | | | | | | | 1 | | | | | | | | | | 2 | | | | | | | | | | 3 | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type (Type) | | | | | | | | Sub type (Sub Type) | | | | | | | | Flag (Flag) | | | | | | | | Reserved (reserved) | | | | | | | |
| VTEP VNI | | | | | | | | | | | | | | | | | | | | | | | | | | | | | | | |

FIG. 7

| 0 | | | | | | | | | 1 | | | | | | | | | 2 | | | | | | | | | 3 | | | | | | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type (Type) | | | | | | | | Sub type (Sub Type) | | | | | | | | Flag (Flag) | | | | | | | | Reserved (reserved) | | | | | | | |
| MAC-VLAN identifier (MAC-VLAN ID) | | | | | | | | | | | | | | | | | | | | | | | | | | | | | | | |

FIG. 8

ROUTE PROCESSING METHOD, DEVICE, AND SYSTEM

CROSS-REFERENCE TO RELATED APPLICATIONS

This application is a continuation of U.S. patent application Ser. No. 16/567,589, now U.S. Pat. No. 11,012,355, filed on Sep. 11, 2019, which is a continuation of International Patent Application No. PCT/CN2017/111608, filed on Nov. 17, 2017, which claims priority to Chinese Patent Application No. 201710151473.5, filed on Mar. 14, 2017. The disclosures of the aforementioned applications are hereby incorporated by reference in their entireties.

TECHNICAL FIELD

This application relates to the field of communications technologies, and in particular, to a route processing method, a device, and a system. More specifically, this application relates to a Virtual Extensible Local Area Network (VXLAN) technology that has an Ethernet virtual private network (EVPN) control plane.

BACKGROUND

A VXLAN is a technology in which a layer 2 packet is encapsulated using a layer 3 protocol. The VXLAN technology relates to a packet in a MAC-in-UDP format. Specifically, an Ethernet frame based on a media access control (MAC) protocol is encapsulated in a User Datagram Protocol (UDP) packet. Further, the UDP packet is encapsulated in an Internet Protocol (IP) packet, and the IP packet may be transmitted in a layer 3 network. Therefore, the Ethernet frame is transmitted in the layer 3 network. In the VXLAN technology, a VXLAN network identifier (VNI) is used to identify a VXLAN segment. Different VXLAN segments correspond to different VNIs. Different VXLAN segments are isolated from each other. Two virtual machines (VMs) in a same VNI do not need to use a VXLAN layer 3 (L3) gateway during communication with each other. Two VMs separately in different VNIs need to communicate with each other using the VXLAN layer 3 gateway. A VNI field includes 24 bits. One management domain may include a maximum of $2^{16}$ VXLAN segments. A virtual extensible local area network (VXLAN) tunnel endpoint (VTEP) may be integrated into a Network Virtualization Edge (NVE) device, and used as an edge device in a VXLAN. The NVE device transmits traffic of the VXLAN through a VXLAN tunnel. The VXLAN tunnel is a logical point-to-point tunnel between two NVE devices.

An EVPN is a layer 2 Virtual Private Network (VPN) technology. The EVPN connects customer sites in different regions using an IP/Multiprotocol Label Switching (MPLS) bearer network. This is, these customer sites are in a same local area network (LAN).

In an application scenario, the VXLAN does not have a control plane. The VXLAN performs VTEP discovery and remote host-address learning using a data plane through multicast-based flooding. As a result, a larger amount of flooding traffic exists in a data center network. The EVPN based on the Border Gateway Protocol (BGP) and MPLS may be used to implement the control plane of the VXLAN. In this specification, the VXLAN scenario with an EVPN control plane is named as an EVPN VXLAN.

In an EVPN VXLAN application scenario, two NVE devices are directly connected to each other using a physical link. For example, two NVE devices are connected to each other using a peer link. However, an EVPN application scenario is limited by the manner in which two NVE devices are directly connected to each other using a physical link, and there is a problem of low reliability and complex deployment.

SUMMARY

In view of this, embodiments of this application provide a route processing method, a device, and a system, to be applied to an EVPN VXLAN application scenario. An EVPN application scenario is not limited by a restriction condition that a physical direct link needs to be used as a link between NVE devices. This helps extend the EVPN application scenario and also helps improve reliability and reduce deployment complexity.

Technical solutions provided in the embodiments of this application are as follows.

According to a first aspect, a route processing method is provided. The method is applied to a VXLAN, and the VXLAN includes a first NVE device and a second NVE device. The first NVE device receives a second Inclusive Multicast Ethernet Tag (IMET) route from the second NVE device. An originating router's IP address field in the second IMET route includes a common VTEP address, and the second IMET route further includes a second VTEP address. The common VTEP address included in the originating router's IP address field in the second IMET route is different from the second VTEP address. Then the first NVE device determines whether the common VTEP address included in the originating router's IP address field in the second IMET route is the same as a common VTEP address stored in the first NVE device. When the first NVE device determines that the common VTEP address included in the originating router's IP address field in the second IMET route is the same as the common VTEP address stored in the first NVE device, the first NVE device establishes a VXLAN tunnel from the first NVE device to the second NVE device based on the second VTEP address in the second IMET route.

Based on the solution provided in this embodiment, an extended IMET route carries a VTEP address different from a common VTEP address, such that after receiving the extended IMET route, an NVE device establishes a VXLAN tunnel from the NVE device to a BGP peer of the NVE device based on the VTEP address. Therefore, an EVPN application scenario is not limited by a restriction condition that a physical direct link needs to be used as a link between NVE devices. This helps extend the EVPN application scenario and also helps improve reliability and reduce deployment complexity.

In a possible implementation of the first aspect, the method further includes: sending, by the first NVE device, a first IMET route to the second NVE device. An originating router's IP address field in the first IMET route carries the common VTEP address stored in the first NVE device, and the first IMET route further includes a first VTEP address. The first VTEP address is used by the second NVE device to establish the VXLAN tunnel from the second NVE device to the first NVE device. The common VTEP address stored in the first NVE device is different from the first VTEP address.

In another possible implementation of the first aspect, the VXLAN further includes a provider edge (PE) device. The method further includes: sending, by the first NVE device, the first IMET route to the PE device; receiving, by the first NVE device, an IMET route from the PE device, where an originating router's IP address field in the IMET route from the PE device carries a VTEP address of the PE device; and establishing, by the first NVE device, a VXLAN tunnel from the first NVE device to the PE device based on the VTEP address of the PE device that is in the IMET route from the PE device, where the VTEP address of the PE device is not the same as the common VTEP address stored in the first NVE device.

In still another possible implementation of the first aspect, the VXLAN further includes a third NVE device. Additionally, the method further includes: receiving, by the first NVE device, a third IMET route from the third NVE device, where an originating router's IP address field in the third IMET route includes a common VTEP address, where the third IMET route further includes a third VTEP address, and where the common VTEP address included in the originating router's IP address field in the third IMET route is different from the third VTEP address; determining, by the first NVE device, whether the common VTEP address included in the originating router's IP address field in the third IMET route is the same as the common VTEP address stored in the first NVE device; and when the first NVE device determines that the common VTEP address included in the originating router's IP address field in the third IMET route is the same as the common VTEP address stored in the first NVE device, establishing, by the first NVE device, a VXLAN tunnel from the first NVE device to the third NVE device based on the third VTEP address in the third IMET route.

Optionally, a customer edge (CE) device is multi-homed to the first NVE device, the second NVE device, and the third NVE device using a plurality of Ethernet links, and the plurality of Ethernet links form an Ethernet segment (ES). The method further includes: determining, by the first NVE device, the first NVE device as a designated forwarder (DF) in the ES based on ES routes from the second NVE device and the third NVE device.

Based on the foregoing implementation, a scenario in which a CE device is multi-homed to more than two NVE devices may be implemented, and all-active redundancy modes of more NVE devices may be supported, in order to help improve reliability of an EVPN VXLAN and flexibility of network deployment.

Optionally, the method further includes: receiving, by the first NVE device through the VXLAN tunnel from the second NVE device to the first NVE device, broadcast, unknown unicast, and multicast (BUM) traffic sent by the second NVE device; and avoiding, by the first NVE device, from forwarding the BUM traffic to the third NVE device through the VXLAN tunnel from the first NVE device to the third NVE device, based on that the BUM traffic is received by the first NVE device through the VXLAN tunnel from the second NVE device to the first NVE device.

Based on the foregoing implementation, not only BUM traffic can be normally forwarded through a VXLAN tunnel between NVE devices, but also forwarding of the BUM traffic to a VXLAN tunnel between other NVE devices can be avoided, in order to avoid dual transmission of the BUM traffic.

In still another possible implementation of the first aspect, a CE device is dual-homed to the first NVE device and the second NVE device using a plurality of Ethernet links, and the plurality of Ethernet links form an ES. The method further includes: determining, by the first NVE device, the first NVE device as a DF in the ES based on an ES route from the second NVE device; sending, by the first NVE device, an Ethernet A-D per ES route to the second NVE device, where the Ethernet Auto-Discovery (A-D) per ES route carries an Ethernet Segment Identifier (ESI) label allocated by the first NVE device to an Ethernet link between the CE device and the first NVE device; receiving, by the first NVE device through the VXLAN tunnel from the second NVE device to the first NVE device, a VXLAN packet sent by the second NVE device, where an original Ethernet payload in the VXLAN packet includes BUM traffic, where the VXLAN packet carries the ESI label, and where the BUM traffic is from the CE device; and avoiding, by the first NVE device based on that the VXLAN packet carries the ESI label, from forwarding the BUM traffic to the CE device using the ES between the CE device and the first NVE device.

Optionally, the ESI label is encapsulated between a VXLAN header in the VXLAN packet and the original Ethernet payload. Additionally, the VXLAN header carries indication information, and the indication information is used to indicate that the VXLAN packet carries the ESI label.

Based on the foregoing implementation, a format of the VXLAN packet is extended, such that the VXLAN packet can carry the ESI label, thereby resolving a loop problem generated in a process of forwarding the BUM traffic.

In still another possible implementation of the first aspect, a CE device is dual-homed to the first NVE device and the second NVE device using a plurality of Ethernet links, and the plurality of Ethernet links form an ES. The method further includes: receiving, by the first NVE device, a MAC/IP advertisement route from the second NVE device, where the MAC/IP advertisement route includes a MAC-VLAN ID, where the MAC-VLAN ID is used to indicate a VLAN to which a MAC address carried in the MAC/IP advertisement route belongs, and where the MAC address carried in the MAC/IP advertisement route is a MAC address of the CE device, or the MAC address carried in the MAC/IP advertisement route is a MAC address of a host in an Ethernet virtual private network site EVPN site administered by the CE device; determining, by the first NVE device based on an ESI and the MAC-VLAN ID that are carried in the MAC/IP advertisement route, a local interface that is of the first NVE device and that connects to an Ethernet link between the CE device and the first NVE device, where the ESI carried in the MAC/IP advertisement route is used to indicate the ES between the CE device and the second NVE device; and sending, by a control plane of the first NVE device, a first MAC entry to a forwarding plane of the first NVE device, where an outbound interface in the first MAC entry is the local interface of the first NVE device, and where the first MAC entry includes the MAC address and the MAC-VLAN ID that are carried in the MAC/IP advertisement route.

Optionally, the first NVE device receives unicast traffic from the second NVE device through the VXLAN tunnel from the second NVE device to the first NVE device, where the unicast traffic is sent by the second NVE device based on that an Ethernet link between the second NVE device and the CE device is faulty. The first NVE device sends the unicast traffic to the CE device based on the first MAC entry using the Ethernet link between the first NVE device and the CE device.

Based on the foregoing implementation, a forwarding path may be redirected using the MAC/IP Advertisement route and a VXLAN tunnel between NVE devices. As such, when a link fault occurs on an Ethernet link, normal forwarding of the unicast traffic can still be ensured.

Optionally, the MAC/IP advertisement route is carried in MP_REACH_NLRI, and a next hop field in the MP_REACH_NLRI includes a common VTEP address. The MAC/IP advertisement route further includes the second VTEP address. The common VTEP address included in the next hop field in the MP_REACH_NLRI is the same as the common VTEP address included in the originating router's IP address field in the second IMET route. The method further includes: sending, by the control plane of the first NVE device, a second MAC entry to the forwarding plane of the first NVE device based on the common VTEP address included in the next hop field in the MP_REACH_NLRI and the second VTEP address included in the MAC/IP advertisement route. An outbound interface in the second MAC entry is a local interface that is of the first NVE device and that connects to the VXLAN tunnel from the first NVE device to the second NVE device. The second MAC entry includes the MAC address carried in the MAC/IP advertisement route.

Optionally, the first NVE device receives unicast traffic sent from the PE device to the CE device. The first NVE device sends the unicast traffic based on the second MAC entry through the VXLAN tunnel from the first NVE device to the second NVE device. As such, the second NVE device forwards the unicast traffic to the CE device based on a MAC entry stored in the second NVE device and using an Ethernet link between the second NVE device and the CE device.

Based on the foregoing implementation, load sharing of the unicast traffic may be further implemented, thereby helping increase transmission bandwidth of the unicast traffic.

In still another possible implementation of the first aspect, a CE device is connected to the second NVE device. The method further includes: receiving, by the first NVE device, a MAC/IP advertisement route from the second NVE device, where the MAC/IP advertisement route is carried in MP_REACH_NLRI, where a next hop field in the MP_REACH_NLRI includes a common VTEP address, where the MAC/IP advertisement route includes a MAC-VLAN ID and the second VTEP address, where the MAC-VLAN ID is used to indicate a VLAN to which a MAC address carried in the MAC/IP advertisement route belongs, and where the MAC address carried in the MAC/IP advertisement route is a MAC address of the CE device, or the MAC address carried in the MAC/IP advertisement route is a MAC address of a host in an EVPN site administered by the CE device; determining, by the first NVE device based on an ESI and the MAC-VLAN ID that are carried in the MAC/IP advertisement route, that the first NVE device has no local interface that connects to an Ethernet link between the CE device and the first NVE device, where the ESI carried in the MAC/IP advertisement route is used to indicate an ES between the CE device and the second NVE device; and sending, by a control plane of the first NVE device, a MAC entry to a forwarding plane of the first NVE device based on the common VTEP address included in the next hop field in the MP_REACH_NLRI and the second VTEP address included in the MAC/IP advertisement route, where an outbound interface in the MAC entry is a local interface that is of the first NVE device and that connects to the VXLAN tunnel from the first NVE device to the second NVE device, and where the MAC entry includes the MAC address carried in the MAC/IP advertisement route.

Optionally, the first NVE device receives unicast traffic sent from the PE device to the CE device. The first NVE device sends the unicast traffic based on the MAC entry through the VXLAN tunnel from the first NVE device to the second NVE device. As such, the second NVE device forwards the unicast traffic to the CE device based on a MAC entry stored in the second NVE device and using an Ethernet link between the second NVE device and the CE device.

Based on the foregoing implementation, it can be ensured that the CE device connected to the NVE device through single homing can normally receive the unicast traffic.

In the first aspect, optionally, a VXLAN attribute in the first IMET route carries the first VTEP address.

In the first aspect, optionally, a VXLAN attribute in the second IMET route carries the second VTEP address.

In the first aspect, optionally, the first IMET route includes a VTEP VNI attribute, where the VTEP VNI attribute carries a VTEP VNI, the VTEP VNI is bound to the first VTEP address, and where the VTEP VNI is used to indicate a broadcast domain (BD) to which the first NVE device belongs.

In the first aspect, optionally, the second IMET route includes a VTEP VNI attribute, where the VTEP VNI attribute carries a VTEP VNI, where the VTEP VNI is bound to the second VTEP address, and where the VTEP VNI is used to indicate a BD to which the second NVE device belongs.

According to a second aspect, a first NVE device is provided, and the first NVE device has functions of implementing actions of the first NVE device in the foregoing method. The function may be implemented by hardware, or may be implemented by executing corresponding software by hardware. The hardware or the software includes one or more modules corresponding to the functions.

In a possible design, a structure of the first NVE device includes a processor and an interface. The processor is configured to support the first NVE device in performing corresponding functions in the foregoing method. The interface is configured to: support communication between the first NVE device and a BGP peer of the first NVE device; and send information or an instruction in the foregoing method to the BGP peer of the first NVE device, or receive information or an instruction in the foregoing method from the BGP peer of first NVE device. The first NVE device may further include a memory. The memory is configured to be coupled to the processor, and stores a program instruction and data that are necessary for the first NVE device.

In another possible design, the first NVE device includes a processor, a transmitter, a random access memory, a read-only memory, and a bus. The processor is separately coupled to the transmitter, the random access memory, and the read-only memory using the bus. When the first NVE device needs to be run, a basic input/output system or a bootloader in an embedded system that is built into the read-only memory is used to lead a system to start, and lead the first NVE device to enter a normal running state. After entering the normal running state, the first NVE device runs an application program and an operating system in the random access memory, such that the processor performs the method in any one of the first aspect or the possible implementations of the first aspect.

According to a third aspect, a first NVE device is provided, and the first NVE device includes a main control board and an interface board, and may further include a switching board. The first NVE device is configured to perform the method in any one of the first aspect or the possible implementations of the first aspect. For example, the first NVE device includes a module configured to perform the method in any one of the first aspect or the possible implementations of the first aspect.

According to a fourth aspect, a first NVE device is provided, and the first NVE device includes a controller and a first NVE forwarding device. The first NVE forwarding device includes an interface board, and may further include a switching board. The first NVE device is configured to perform functions of the interface board in the third aspect, and may further perform functions of the switching board in the third aspect. The controller includes a receiver, a processor, a transmitter, a random-access memory, a read-only memory, and a bus. The processor is separately coupled to the receiver, the transmitter, the random-access memory, and the read-only memory using the bus. When the controller needs to be run, a basic input/output system or a bootloader in an embedded system that is built into the read-only memory is used to lead a system to start, and lead the controller to enter a normal running state. After entering the normal running state, the controller runs an application program and an operating system in the random-access memory, such that the processor performs functions of the main control board in the third aspect.

According to a fifth aspect, a network system for processing a route is provided. The network system includes at least two NVE devices, and each of the at least two NVE devices is the first NVE device according to the second aspect, the third aspect, or the fourth aspect.

According to a sixth aspect, a computer storage medium is provided and is configured to store a program, code, or an instruction used by the first NVE device, and when a processor or a hardware device executes the program, the code, or the instruction, functions or steps of the first NVE device in the foregoing aspects may be completed.

In the foregoing solutions, according to the route processing method, the device, and the system provided in the embodiments of this application, in an EVPN VXLAN application scenario, an NVE device set including at least two NVE devices includes a common VTEP address. The common VTEP address is used to identify a common VTEP, and the common VTEP is deployed on each NVE device in the NVE device set. In addition, each NVE device in the NVE device set includes a VTEP address, and the VTEP address is used to identify a VTEP included in a corresponding NVE device. An NVE device in the NVE device set establishes a VXLAN tunnel from the NVE device to a BGP peer of the NVE device based on a VTEP address and the common VTEP address using an IMET route. Therefore, in the EVPN VXLAN application scenario, an EVPN application scenario is not limited by a restriction condition that a physical direct link needs to be used as a link between NVE devices. This helps extend the EVPN application scenario and also helps improve reliability and reduce deployment complexity.

BRIEF DESCRIPTION OF DRAWINGS

FIG. 2A and FIG. 2B are flowcharts of a route processing method according to an embodiment of this application;

FIG. 7 is a schematic diagram of a format of a VTEP VNI attribute according to an embodiment of this application;

FIG. 8 is a schematic diagram of a format of a MAC-VLAN attribute according to an embodiment of this application;

DESCRIPTION OF EMBODIMENTS

Embodiments of this application provide a route processing method, a device, and a system, to be applied to an EVPN VXLAN application scenario. An EVPN application scenario is not limited by a restriction condition that a physical direct link needs to be used as a link between NVE devices. This helps extend the EVPN application scenario and also helps improve reliability and reduce deployment complexity.

The following provides detailed descriptions using embodiments separately.

For an EVPN technology in this application, refer to descriptions of the Internet Engineering Task Force (IETF) Request for Comments (RFC) 7432. The RFC 7432 is incorporated in this application by reference in its entirety.

In the embodiments of this application, the expression "a device includes a VTEP address" or the expression "a VTEP address in a device" means that a VTEP address is stored in a device. The expression "a device includes a common VTEP address" or the expression "a common VTEP address in a device" means that a common VTEP address is stored in a device. The device may be an NVE device, a provider edge (PE) device, or a VTEP.

Figure 1:
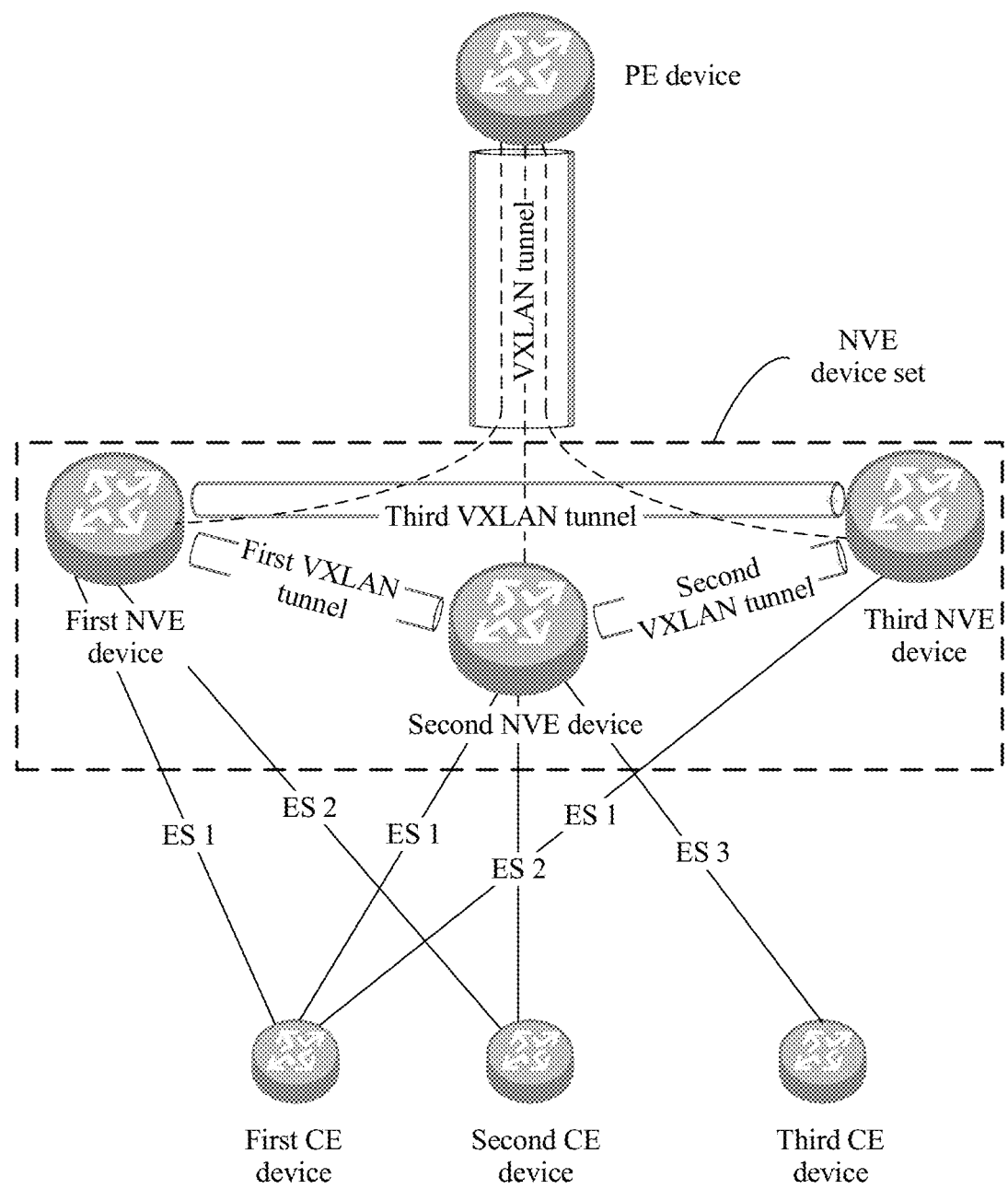
FIG. 1 is a schematic structural diagram of an EVPN VXLAN according to an embodiment of this application.

FIG. 1 is a schematic structural diagram of an EVPN VXLAN according to an embodiment of this application. The EVPN VXLAN is a VXLAN having an EVPN control plane. The EVPN VXLAN includes an NVE device set, and the NVE device set includes at least two NVE devices. As shown in FIG. 1, the NVE device set includes a first NVE device, a second NVE device, and a third NVE device. It should be understood that in this application, a quantity of NVE devices included in the NVE device set is not limited, and there may be two, three or more NVE devices. Any two NVE devices in the NVE device set are a pair of BGP peers. In an EVPN scenario, the BGP peer may also be referred to as an EVPN peer. FIG. 1 is used as an example. The first NVE device and the second NVE device are a pair of BGP peers, the first NVE device and the third NVE device are a pair of BGP peers, and the second NVE device and the third NVE device are a pair of BGP peers. "A pair of BGP peers" may be understood as that one device is a BGP peer of the other device. For example, that the first NVE device and the second NVE device are a pair of BGP peers may be understood as that the first NVE device is a BGP peer of the second NVE device, or understood as that the second NVE device is a BGP peer of the first NVE device. The BGP peer may also be referred to as a BGP neighbor. Correspondingly, the EVPN peer may also be referred to as an EVPN neighbor. In this application, for ease of description, the BGP peer is used in all subsequent embodiments. The BGP peer is established using an open message specified in the BGP, and the established BGP peer is maintained using a keepalive message. For implementation of the OPEN message and the KEEPALIVE message, refer to related descriptions of the IETF RFC 2858 and the IETF RFC 1771. In addition, a route reflector (RR) may be deployed on each of two end devices that establish the BGP peer, such that establishment of the BGP peer is completed using the RRs. An NVE device included in an NVE device set may also be referred to as a PE device. Unless otherwise specified in this application, the NVE device is equivalent to the PE device. In descriptions of this application, a device included in an NVE device set is named as an NVE device. However, the NVE device included in the NVE device set may also be referred to as a PE device. Correspondingly, the NVE device set may also be referred to as a PE device set.

The EVPN VXLAN further includes a PE device. As shown in FIG. 1, the PE device is outside the NVE device set. The PE device and each NVE device in the NVE device set may form a pair of BGP peers. FIG. 1 is used as an example. The PE device is a BGP peer of each of the first NVE device, the second NVE device, and the third NVE device. The PE device may be a physical device, or may be a logical device including a plurality of physical devices. In addition, the PE device may be connected to another network device. For example, the PE device is connected to one or more customer edge (CE) devices.

The EVPN VXLAN further includes at least one CE device. FIG. 1 shows three CE devices as an example: a first CE device, a second CE device, and a third CE device. The first CE device is multi-homed to the first NVE device, the second NVE device, and the third NVE device, that is, the first CE device communicates with the first NVE device, the second NVE device, and the third NVE device separately. The second CE device is dual-homed to the first NVE device and the second NVE device, that is, the second CE device communicates with the first NVE device and the second NVE device separately. The third CE device is single-homed to the second NVE device, that is, the third CE device communicates with the second NVE device. In addition, it should be understood that multi-homing may be dual-homing. As shown in the foregoing specification, the two expressions coexist to distinguish between quantities of NVE devices connected to the CE devices.

In the EVPN VXLAN, the CE device and the NVE device are connected to each other using an Ethernet link. In addition, all Ethernet links connected to a same CE device form an Ethernet segment (ES). FIG. 1 is used as an example. The first CE device is multi-homed to the first NVE device, the second NVE device, and the third NVE device using three Ethernet links. The three Ethernet links form an ES, and the ES is represented by an ES 1 in FIG. 1. An Ethernet segment identifier (ESI) is used to identify a corresponding ES. FIG. 1 is used as an example. ESI values of ESs 1 of the three Ethernet links that connect the first CE device to the first NVE device, the second NVE device, and the third NVE device are a same value. ESI values of ESs 2 of two Ethernet links that connect the second CE device to the first NVE device and the second NVE device are a same value. The ESI value of the ES 1 and the ESI value of the ES 2 are unequal, and both are non-zero values. An ESI value of an ES 3 is zero. The ESI includes a type field and an ESI value field, and the type field is used to indicate a generation manner of the ESI. Two commonly used generation manners are a type 0 and a type 1. The type 0 indicates that the ESI is generated through manual configuration, and the type 1 indicates that the ESI is generated using the Link Aggregation Control Protocol (LACP) running between an NVE device and a CE device. A value of the ESI value field ranges from 0 to 0xFF, and "0x" represents hexadecimal. For generation and setting of the ES and the ESI, refer to descriptions of Chapter 5 of the RFC 7432.

In the EVPN VXLAN shown in FIG. 1, the NVE device and the PE device each may be a router or a layer 3 switch. The CE device may be a router, a switch, or a host. The NVE device, the PE device, and the CE device in this embodiment of this application correspond devices defined in the RFC 7432. When the CE device is a router or a switch, the CE device may be connected to one or more hosts. The host may be a physical device or a VM. The EVPN VXLAN shown in FIG. 1 may be applied to a plurality of scenarios. For example, the EVPN VXLAN is applied to a mobile bearer network, and a typical mobile bearer network is an IP radio access network (RAN). In the mobile bearer network, the first CE device, the second CE device, and the third CE device may be a base transceiver station (BTS); the PE device may be connected to a base station controller (BSC) or a radio network controller (RNC); the first NVE device, the second NVE device, and the third NVE device may be a cell site gateway (CSG); and the PE device may be a radio network controller (RNC) site gateway (RSG). For another example, the EVPN VXLAN is applied to a fixed network. In the fixed network, the first CE device, the second CE device, and the third CE device may be user-side stations; the first NVE device, the second NVE device, and the third NVE device may be a digital subscriber line access multiplexer (DSLAM); and the PE device may be a broadband access server (BAS).

In the EVPN VXLAN shown in FIG. 1, a VXLAN tunnel is established between the PE device and the NVE device set. For the PE device, the NVE device set is like a single NVE device, that is, all the NVE devices in the NVE device set are virtualized as a single NVE device. In a possible implementation scenario, actual traffic forwarded from the PE device to the first NVE device, the second NVE device, and the third NVE device is carried on a plurality of physical links (shown as dashed lines in FIG. 1 that separately connect the PE device to the first NVE device, the second NVE device, and the third NVE device) from the PE device to the first NVE device, the second NVE device, and the third NVE device. In another possible implementation scenario, a router is included between the PE device and the NVE device set. The router performs IP forwarding to implement a traffic offloading function. The PE device is connected to the router using a physical link. The router is connected to the first NVE device, the second NVE device, and the third NVE device using a plurality of physical links. In the foregoing two possible implementation scenarios, physical links from the PE device to a plurality of NVE devices in the NVE device set are virtualized as a single VXLAN tunnel. Therefore, when sending a packet to the NVE device set, the PE device considers the NVE device set as a single NVE device. To achieve the foregoing objective, the NVE device set includes a common VTEP. The common VTEP includes a common VTEP address. The common VTEP address is used to identify the common VTEP. The common VTEP address may be an IP address. In addition, the common VTEP is deployed on each NVE device in the NVE device set. In this way, each NVE device in the NVE device set includes the common VTEP. The NVE devices in the NVE device set include a same VTEP, and the NVE devices in the NVE device set include a same VTEP address. Therefore, in this application, a set including NVE devices that include a same VTEP is referred to as an NVE device set. After receiving an inclusive multicast Ethernet tag (IMET) route sent by each NVE device in the NVE device set, the PE device determines that only one VTEP address (the common VTEP address) exists at a transmit end of the IMET route. Therefore, for the PE device, the NVE device set is like an NVE device. The PE device establishes a VXLAN tunnel using the common VTEP as an endpoint of the VXLAN tunnel. FIG. 1 is used as an example. A value of the common VTEP address of the NVE device set is 9.9.9.9. The common VTEP including the common VTEP address is deployed on each of the first NVE device, the second NVE device, and the third NVE device. The PE device may establish a VXLAN tunnel from the PE device to the NVE device set based on the received IMET route from the NVE device. For an implementation of establishing the VXLAN tunnel, refer to descriptions of a subsequent embodiment of this application. In addition, from a perspective of the PE device, the NVE device set is a virtual NVE device. Use of "set" in the technical term "NVE device set" constitutes no limitation to this application. For example, "group" may be used to replace "set", that is, "NVE device group".

In the NVE device set, a VXLAN tunnel is established between NVE devices. That is, a VXLAN tunnel is established between each pair of BGP peers in the NVE device set. FIG. 1 is used as an example. A first VXLAN tunnel is established between the first NVE device and the second NVE device. A second VXLAN tunnel is established between the second NVE device and the third NVE device. A third VXLAN tunnel is established between the first NVE device and the third NVE device. To achieve the foregoing objective, each NVE device in the NVE device set further includes a VTEP, and the VTEP includes a VTEP address. In addition, the VTEP address is unique in the EVPN VXLAN. The VTEP address is used to identify a VTEP in a corresponding NVE device. The VTEP address may be an IP address. Further, the common VTEP address of the NVE device set is different from an endpoint address of a VXLAN tunnel between any two NVE devices in the NVE device set. FIG. 1 is used as an example. The first NVE device includes the common VTEP mentioned above, and a value of the common VTEP address included in the common VTEP is 9.9.9.9. The first NVE device further includes a first VTEP, and a value of a first VTEP address included in the first VTEP is 1.1.1.1. The second NVE device includes the common VTEP mentioned above, and the value of the common VTEP address is 9.9.9.9. The second NVE device further includes a second VTEP, and a value of a second VTEP address included in the second VTEP is 2.2.2.2. The third NVE device includes the common VTEP mentioned above, and the value of the common VTEP address is 9.9.9.9. The third NVE device further includes a third VTEP, and a value of a third VTEP address included in the third VTEP is 3.3.3.3. An NVE device in the NVE device set may establish a VXLAN tunnel from the NVE device to a BGP peer of the NVE device based on a VTEP address and the common VTEP address using an IMET route. For an implementation of establishing the VXLAN tunnel, refer to descriptions of a subsequent embodiment of this application.

In the foregoing implementation, in an EVPN VXLAN application scenario, an NVE device set including at least two NVE devices includes a common VTEP address. The common VTEP address is used to identify a common VTEP, and the common VTEP is deployed on each NVE device in the NVE device set. In addition, each NVE device in the NVE device set includes a VTEP address, and the VTEP address is used to identify a VTEP included in a corresponding NVE device. An NVE device in the NVE device set establishes a VXLAN tunnel from the NVE device to a BGP peer of the NVE device based on a VTEP address and the common VTEP address using an IMET route. Therefore, in the EVPN VXLAN application scenario, NVE devices in the NVE device set are interconnected through a VXLAN tunnel, such that a link between NVE devices in the NVE device set is not limited to a physical direct link. The VXLAN tunnel is used to implement interconnection between the NVE devices, such that even if a switching node exists between the NVE devices in the NVE device set, implementation of the EVPN VXLAN is not affected. When the NVE device in the NVE device set is deployed, the NVE device is not affected by a deployment region and distance, thereby improving deployment flexibility. Further, a link between the NVE devices in the NVE device set is not limited to a physical direct link, thereby helping improve deployment flexibility.

Figure 2A:
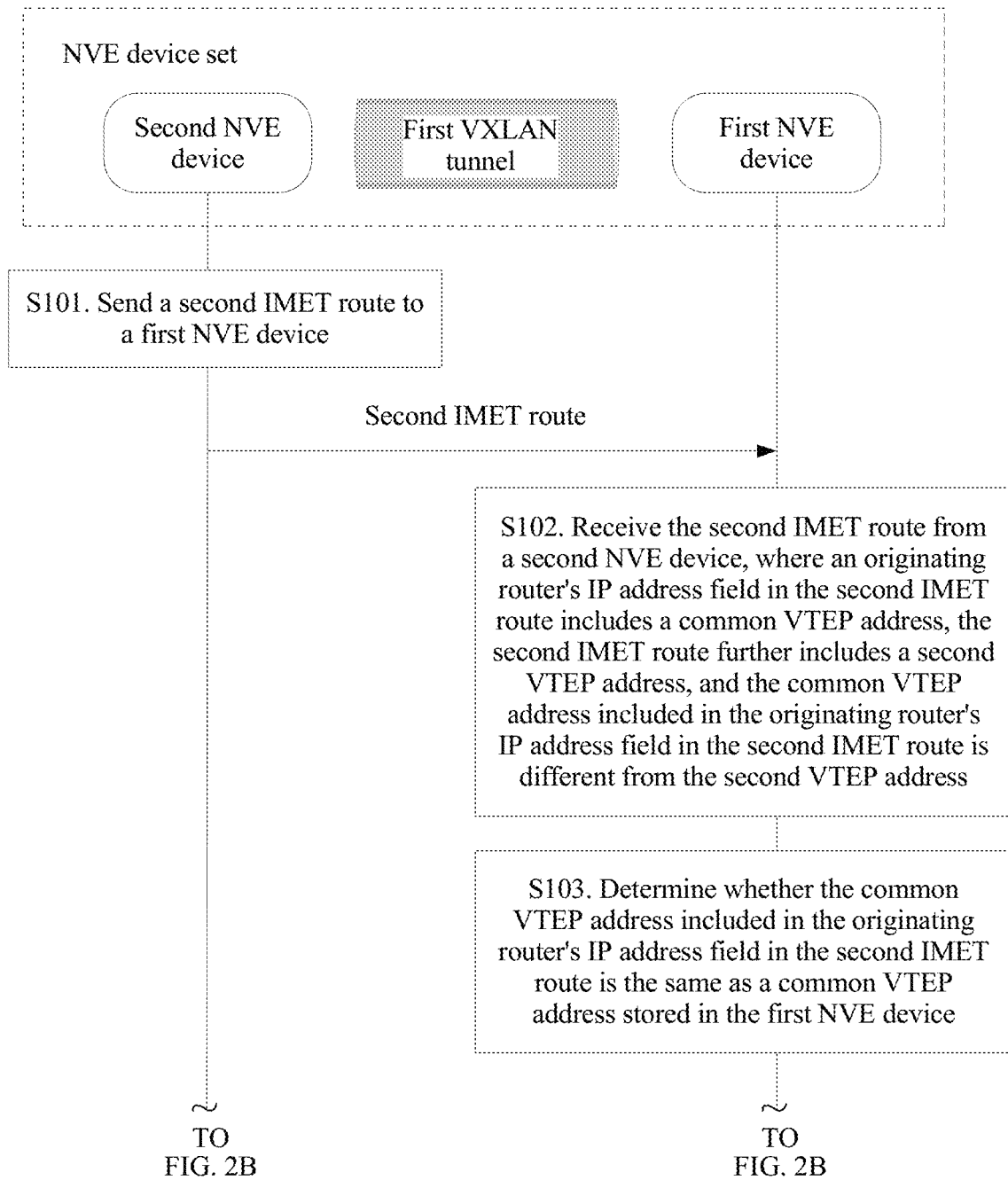

FIG. 2A and FIG. 2B are flowcharts of a route processing method according to an embodiment of this application. The method shown in FIG. 2A and FIG. 2B may be applied to the EVPN VXLAN shown in FIG. 1. That is, the method shown in FIG. 2A and FIG. 2B may be applied to the VXLAN having an EVPN control plane shown in FIG. 1. The EVPN VXLAN includes a first NVE device and a second NVE device. The first NVE device and the second NVE device are a pair of BGP peers. For an implementation of establishing a BGP peer, refer to descriptions of the foregoing embodiment. Details are not described herein again. FIG. 2A shows an NVE device set, and the first NVE device and the second NVE device are included in the NVE device set. It should be understood that in an actual application scenario, from a perspective of a PE device, the NVE device set is a single virtual NVE device. The first NVE device and the second NVE device each include a common VTEP. For ease of description, the expression of the NVE device set is used in this embodiment of this application. FIG. 2A shows two NVE devices. It should be understood that in an actual application scenario, a quantity of NVE devices in the NVE device set may be greater than 2. When the quantity of NVE devices in the NVE device set can be greater than 2, any two NVE devices in the NVE device set can implement the route processing method shown in FIG. 2A and FIG. 2B. The method shown in FIG. 2A and FIG. 2B include S101 to S104, and may further include S105.

S101. The second NVE device sends a second IMET route to the first NVE device.

S102. The first NVE device receives the second IMET route from the second NVE device, where an Originating Router's IP Address field in the second IMET route includes a common VTEP address, the second IMET route further includes a second VTEP address, and the common VTEP address included in the originating router's IP address field in the second IMET route is different from the second VTEP address.

Based on the descriptions of the scenario shown in FIG. 1 in the foregoing embodiment, the NVE device set includes a common VTEP, the common VTEP includes a common VTEP address, and the VTEP address may be an IP address. The common VTEP is deployed on each NVE device in the NVE device set. With reference to FIG. 2A and FIG. 2B, the common VTEP is deployed on each of the first NVE device and the second NVE device. Optionally, the common VTEP address may be deployed in the common VTEP on each NVE device in the NVE device set in a static configuration manner. In this way, based on the common VTEP address, from the perspective of the PE device, the NVE device set may be virtualized as a single NVE device.

An NVE device in the NVE device set further includes a VTEP, the VTEP includes a VTEP address, and the VTEP address may be an IP address. With reference to FIG. 2A and FIG. 2B, the first NVE device further includes a first VTEP, and the first VTEP includes a first VTEP address. The second NVE device further includes a second VTEP, and the second VTEP includes a second VTEP address. The first VTEP address and the second VTEP address are unique in the EVPN VXLAN, and neither a value of the first VTEP address nor a value of the second VTEP address is equal to a value of the common VTEP address. Based on the foregoing, the NVE device in the NVE device set includes both the common VTEP address and a VTEP address of the NVE device. For example, the common VTEP address and the VTEP address are stored in a memory of the NVE device, such that a processor of the NVE device can access the common VTEP address and the VTEP address.

The second NVE device sends the second IMET route to the first NVE device. An IMET route mentioned in the RFC 7432 is used as the IMET route used in this embodiment of this application, and the IMET route mentioned in the RFC 7432 is extended in this embodiment of this application. For a format and a function of the IMET route, refer to descriptions of the RFC 7432. For example, the second NVE device may send the second IMET route to the first NVE device in the following manner. The second NVE device may send an update message to the first NVE device. The update message carries a multiprotocol reachable network layer reachability information (NLRI or Multiprotocol Reachable NLRI (MP_REACH_NLRI)) attribute, and a full name of the NLRI is network layer reachability information. The MP_REACH_NLRI attribute includes an EVPN NLRI field and a next hop field. The EVPN NLRI field is used to carry the second IMET route. For definitions of the update message and the MP_REACH_NLRI attribute, refer to descriptions of the RFC 4760. For a definition of the EVPN NLRI field, refer to descriptions of Chapter 7 of the RFC 7432.

The second IMET route includes the originating router's IP address field. In this embodiment of this application, both a value of the next hop field and a value of an originating router's IP address in the second IMET route are set to a common VTEP address 9.9.9.9. After the second IMET route is advertised to another NVE device in the NVE device set and the PE device (shown in FIG. 1) outside the NVE device set, it is ensured that the second NVE device can receive a packet transmitted by the PE device and the other NVE device.

In this embodiment of this application, the IMET route mentioned in the RFC 7432 is further extended, such that the IMET route can carry a VTEP address of an NVE device that sends the IMET route. For example, a management IP address (or referred to as a device IP address) of the NVE device may be used as the VTEP address. In this setting, the second IMET route carries both the common VTEP address 9.9.9.9 and a second VTEP address 1.1.1.1.

Figure 6:
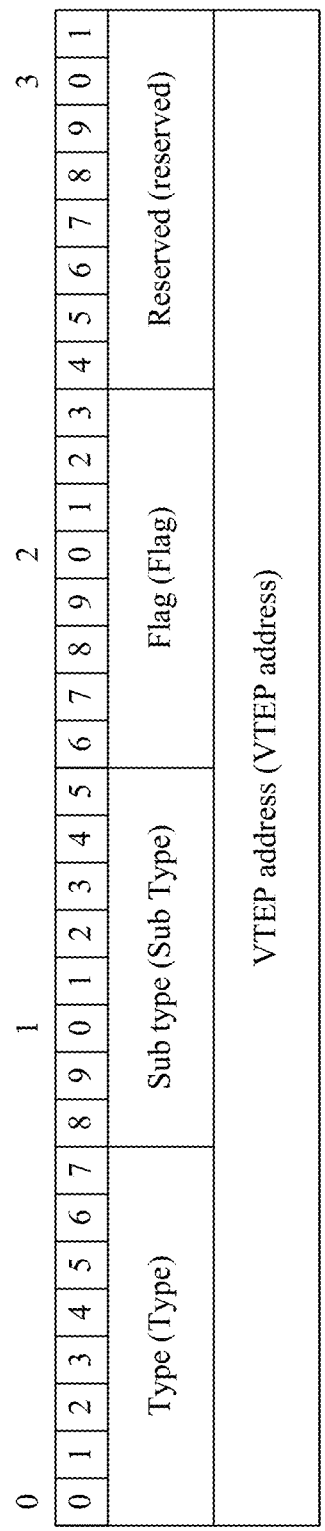
FIG. 6 is a schematic diagram of a format of a VXLAN attribute according to an embodiment of this application.

In a solution, a new attribute is extended in this embodiment of this application to carry the VTEP address. As shown in FIG. 6, a VXLAN attribute is extended in this embodiment of this application to carry the VTEP address. A type field and a sub type field are used to indicate a type of the VXLAN attribute, and specific values of the type field and the sub type field each may be set according to a requirement of a standard organization. A flag field may be used to indicate whether the VTEP address in the VXLAN attribute is allowed to be read. For example, if the flag field is 0, it indicates that the VTEP address in the VXLAN attribute is not allowed to be read; or if the flag field is 1, it indicates that the VTEP address in the VXLAN attribute is allowed to be read. It should be understood that the foregoing functions of the flag field are used as an example, and a function of the flag field may correspondingly change based on a use scenario. A VTEP address field is used to carry a value of the VTEP address. A reserved field is used to implement further extension. The VXLAN attribute may be carried in the IMET route as an attribute, in order to implement the solution in this embodiment of this application. The second IMET route is used as an example. The second IMET route carries the VXLAN attribute, and the VXLAN attribute includes the second VTEP address.

The second IMET route may further carry a VNI, and the VNI is used to indicate a BD to which the second NVE device belongs. More specifically, the VNI is used to indicate a BD to which a port used by the second NVE device to send the second IMET route belongs. In this application, the BD may be referred to as a broadcast domain (BD) or a bridge domain (BD). The VNI may be carried in a Provider Multicast Service Interface (PMSI) tunnel attribute of the second IMET route. The PMSI tunnel attribute includes an MPLS label field, and the MPLS label field is used to carry the VNI.

In this embodiment of this application, the VNI may be configured in two forms: a common VTEP VNI and a VTEP VNI. The common VTEP VNI is used to bind to the common VTEP address, and the VTEP VNI is used to bind to the VTEP address. With reference to FIG. 1, the common VTEP address is used as an endpoint address of a VXLAN tunnel established between the PE device and the NVE device set. Therefore, the VXLAN tunnel established between the PE device and the NVE device set corresponds to the common VTEP VNI. The VTEP address is used as an endpoint address of a VXLAN tunnel established between the NVE devices in the NVE device set. Therefore, the VXLAN tunnel established between the NVE devices corresponds to the VTEP VNI. In this embodiment of this application, the common VTEP VNI and the VTEP VNI may be set to be the same, or may be set to be different.

If the common VTEP VNI and the VTEP VNI are set to be the same, the VXLAN tunnel established between the PE device and the NVE device set and the VXLAN tunnel established between the NVE devices in the NVE device set correspond to a same BD. When the common VTEP VNI and the VTEP VNI are set to be the same, VNI information may be carried according to the foregoing implementation. To be more specific, the VNI is carried in the MPLS label field included in the PMSI tunnel attribute, and the VNI is used to indicate both the common VTEP VNI and the VTEP VNI. The VNI carried in the MPLS label field included in the PMSI tunnel attribute is used in both a process of establishing the VXLAN tunnel between the PE device and the NVE device set and a process of establishing the VXLAN tunnel between the NVE devices in the NVE device set.

If the common VTEP VNI and the VTEP VNI are set to be different, the VXLAN tunnel established between the PE device and the NVE device set and the VXLAN tunnel established between the NVE devices in the NVE device set correspond to different BDs. For example, the VXLAN tunnel established between the PE device and the NVE device set corresponds to a BD 1, and the VXLAN tunnel established between the NVE devices in the NVE device set corresponds to a BD 2. That "the common VTEP VNI and the VTEP VNI are set to be different" described above means that a same VTEP VNI is used for all VXLAN tunnels established between the NVE devices in the NVE device set, and the VTEP VNI is different from the common VTEP VNI. When the common VTEP VNI and the VTEP VNI are set to be different, VNI information may be carried according to the following implementation. The common VTEP VNI is carried in the MPLS label field included in the PMSI tunnel attribute. In addition, a new attribute is extended in this embodiment of this application to carry the VTEP VNI. As shown in FIG. 7, a VTEP VNI attribute is extended in this embodiment of this application to carry the VTEP VNI. A type field and a sub type field are used to indicate a type of the VTEP VNI attribute, and specific values of the type field and the sub type field each may be set according to a requirement of a standard organization. A flag field may be used to indicate whether the VTEP VNI in the VTEP VNI attribute is allowed to be read. For example, if the flag field is 0, it indicates that the VTEP VNI in the VTEP VNI attribute is not allowed to be read; or if the flag field is 1, it indicates that the VTEP VNI in the VTEP VNI attribute is allowed to be read. It should be understood that the foregoing functions of the flag field are used as an example, and a function of the flag field may correspondingly change based on a use scenario. A VTEP VNI field is used to carry a value of the VTEP VNI. A reserved field is used to implement further extension. The VTEP VNI attribute may be carried in an IMET route as an attribute. When receiving an IMET route advertised by an NVE device in the NVE device set, the PE device establishes a VXLAN tunnel based on the common VTEP VNI, and does not parse the VTEP VNI attribute, in order to ignore the VTEP VNI. Correspondingly, after receiving an IMET route advertised by another NVE device, the NVE device in the NVE device set preferably establishes a VXLAN tunnel based on the VTEP VNI in the VTEP VNI attribute. If the NVE device in the NVE device set determines that the VTEP VNI attribute does not exist in the received IMET route, the NVE device establishes a corresponding VXLAN tunnel using the common VTEP VNI carried in the MPLS label field included in the PMSI tunnel attribute.

Further, the VXLAN tunnels established between the NVE devices in the NVE device set may use different VTEP VNIs. For example, in FIG. 1, the first VXLAN tunnel uses a VTEP VNI 1 and corresponds to a BD 21, the second VXLAN tunnel uses a VTEP VNI 2 and corresponds to a BD 22, and the third VXLAN tunnel uses a VTEP VNI 3 and corresponds to a BD 23. In this way, a plurality of VNIs are allowed to be configured for the NVE device, such that the NVE device can establish VXLAN tunnels corresponding to different BDs. In this embodiment of this application, to make the technical solution easier to understand, the common VTEP VNI and the VTEP VNI are set to be the same, and the VNI may be used to represent the common VTEP VNI and the VTEP VNI in subsequent descriptions. It should be understood that in this embodiment of this application, in addition to setting the common VTEP VNI and the VTEP VNI to be the same, the common VTEP VNI and the VTEP VNI may be set to be different. Further, different VTEP VNIs may be set, and this embodiment of this application is implemented with reference to the foregoing descriptions.

A route distinguisher (RD) field in the second IMET route is used to indicate an EVPN instance (EVI) corresponding to the second NVE device. An Ethernet tag field in the second IMET route may be set to a virtual local area network (VLAN) identifier (ID) (VID) corresponding to a MAC address included in a CE device connected to the second NVE device or set to a BD corresponding to the second NVE device. An IP address length field in the second IMET route is used to indicate a length of the originating router's IP address.

The PMSI tunnel attribute of the second IMET route further includes a tunnel type field, and the tunnel type field is used to indicate a type of an established tunnel. In this embodiment of this application, a value of the tunnel type field is set to 6, and this is used to identify that a type of an established tunnel is ingress replication. The second IMET route further includes a VXLAN tunnel attribute, and a format of the VXLAN tunnel attribute is similar to the attribute format shown in FIG. 6 or FIG. 7. A difference lies in that the VTEP address field in FIG. 6 or the VTEP VNI field in FIG. 7 is replaced with a VXLAN tunnel type field. The VXLAN tunnel type field is used to indicate that an established tunnel is a VXLAN tunnel. A value of the VXLAN tunnel type field is determined by a standard organization. For example, the value of the VXLAN tunnel type field is 8. For an implementation in which the first NVE device establishes a VXLAN tunnel using the second IMET route, refer to subsequent descriptions of this embodiment. The PMSI tunnel attribute of the second IMET route further includes a Tunnel Identifier field. In this embodiment of this application, the common VTEP address may be filled in the tunnel identifier field.

S103. The first NVE device determines whether the common VTEP address included in the originating router's IP address field in the second IMET route is the same as a common VTEP address stored in the first NVE device.

The first NVE device can send, to a BGP peer of the first NVE device, an IMET route whose originating router's IP address field carries the common VTEP address stored in the first NVE device. The common VTEP address included in the originating router's IP address field in the second IMET route is the same as the common VTEP address stored in the first NVE device.

The second NVE device can advertise the second IMET route to the outside, and the first NVE device and the second NVE device are a pair of BGP peers. Therefore, the first NVE device can receive the second IMET route.

After receiving the second IMET route, the first NVE device parses the second IMET route to obtain the common VTEP address included in the originating router's IP address field in the second IMET route. The first NVE device determines whether the common VTEP address included in the originating router's IP address field in the second IMET route is the same as the common VTEP address stored in the first NVE device. In this embodiment of this application, the first NVE device and the second NVE device each include the common VTEP. Therefore, the common VTEP address included in the originating router's IP address field in the second IMET route is the same as the common VTEP address stored in the first NVE device. When advertising an IMET route to the outside, the first NVE device adds the common VTEP address stored in the first NVE device to an originating router's IP address field in the IMET route. To be more specific, the common VTEP address stored in the first NVE device is the common VTEP address in the common VTEP included in the first NVE device. If the first NVE device determines that the common VTEP address included in the originating router's IP address field in the second IMET route is the same as the common VTEP address stored in the first NVE device, the first NVE device may determine that the first NVE device and the second NVE device belong to a same NVE device set.

S104. When the first NVE device determines that the common VTEP address included in the originating router's IP address field in the second IMET route is the same as the common VTEP address stored in the first NVE device, the first NVE device establishes a VXLAN tunnel from the first NVE device to the second NVE device based on the second VTEP address in the second IMET route.

Based on the foregoing result of determining, the first NVE device can establish the VXLAN tunnel from the first NVE device to the second NVE device based on the second VTEP address. For example, the first NVE device continues to parse the second IMET route to obtain the second VTEP address in the second IMET route, and establishes the VXLAN tunnel from the first NVE device to the second NVE device using the second VTEP address as a destination endpoint address of the VXLAN tunnel.

In a possible implementation, with reference to the descriptions of S101 and S102, the second VTEP address is carried in a VXLAN attribute. Based on the foregoing result of determining, that is, the first NVE device determines that the common VTEP address included in the originating router's IP address field in the second IMET route is the same as the common VTEP address stored in the first NVE device, the first NVE device checks whether the second IMET route carries the VXLAN attribute. If the first NVE device determines that the second IMET route carries the VXLAN attribute, the first NVE device obtains the second VTEP address in the VXLAN attribute, and establishes the VXLAN tunnel from the first NVE device to the second NVE device using the second VTEP address as the destination endpoint address of the VXLAN tunnel.

For example, based on that the value of the tunnel type field in the PMSI tunnel attribute of the second IMET route is 6, the first NVE device determines that the type of the established tunnel is ingress replication. The first NVE device parses the VXLAN tunnel attribute of the second IMET route to obtain a value of the VXLAN tunnel type field in the VXLAN tunnel attribute, in order to determine that the established tunnel is a VXLAN tunnel. After determining that the established tunnel is a VXLAN tunnel, the first NVE device generates a VXLAN tunnel table and a VXLAN tunnel ingress replication table. The VXLAN tunnel table includes a tunnel identifier, a source endpoint address, and a destination endpoint address. The tunnel identifier is used to identify a VXLAN tunnel. The source endpoint address is the first VTEP address included in the first NVE device, for example, 1.1.1.1. The destination endpoint address is the second VTEP address obtained from the second IMET route, for example, 2.2.2.2. The VXLAN tunnel ingress replication table includes a VNI and a BGP peer address. Based on the foregoing descriptions, the VNI may be obtained from the MPLS label field included in the PMSI tunnel attribute or from the VTEP VNI attribute. The BGP peer address is the second VTEP address obtained from the second IMET route, for example, 2.2.2.2. Therefore, the first NVE device establishes the VXLAN tunnel from the first NVE device to the second NVE device.

If the first NVE device determines that a VTEP address included in an originating router's IP address field in a received IMET route is different from the common VTEP address stored in the first NVE device, the first NVE device may determine that the first NVE device and a device that sends the IMET route do not belong to a same NVE device set. The first NVE device establishes, based on the VTEP address included in the originating router's IP address field in the received IMET route, a VXLAN tunnel from the first NVE device to the device that sends the IMET route, instead of establishing the VXLAN tunnel based on a VTEP address in a VXLAN attribute. Similarly, for details, refer to a process of establishing a VXLAN tunnel between a PE device and an NVE device set described in a subsequent embodiment.

If the first NVE device determines that the common VTEP address included in the originating router's IP address field in the second IMET route is the same as the common VTEP address stored in the first NVE device, but cannot further find the second VTEP address or the VXLAN attribute, the first NVE device discards the second IMET route, and returns an error message to the second NVE device. Further, optionally, the first NVE device may feed back the error message to a network management device of the EVPN VXLAN. This setting helps improve reliability of establishing a VXLAN tunnel.

Optionally, S105. The first NVE device sends a first IMET route to the second NVE device, where an originating router's IP address field in the first IMET route carries the common VTEP address stored in the first NVE device, the first IMET route further includes a first VTEP address, the first VTEP address is used by the second NVE device to establish the VXLAN tunnel from the second NVE device to the first NVE device, and the common VTEP address stored in the first NVE device is different from the first VTEP address.

For an implementation process in which the first NVE device sends the first IMET route to the second NVE device, and an implementation of the first IMET route, refer to the descriptions of S101 and S102 in this embodiment. Details are not described herein again.

After receiving the first IMET route, the second NVE device may establish the VXLAN tunnel from the second NVE device to the first NVE device based on the first IMET route. For an implementation process in which the second NVE device establishes the VXLAN tunnel from the second NVE device to the first NVE device based on the first IMET route, refer to the descriptions of S103 and S104 in this embodiment. Details are not described herein again.

It should be understood that the descriptions of the foregoing embodiment constitute no limitation on a sequence of an execution process in S105 and execution processes in S101 to S104. For example, S105 may be performed before S101, S105 and S101 may be simultaneously triggered, or S105 may be performed after S101.

Through the foregoing process, the VXLAN tunnel can be established between the first NVE device and the second NVE device, and endpoint addresses of two ends of the VXLAN tunnel are the first VTEP address and the second VTEP address.

In the foregoing implementation, in an EVPN VXLAN application scenario, an NVE device set including at least two NVE devices includes a common VTEP address. The common VTEP address is used to identify a common VTEP, and the common VTEP is deployed on each NVE device in the NVE device set. In addition, each NVE device in the NVE device set includes a VTEP address, and the VTEP address is used to identify a VTEP included in a corresponding NVE device. An NVE device in the NVE device set establishes a VXLAN tunnel between the NVE devices in the NVE device set based on a VTEP address and the common VTEP address using an IMET route. Therefore, in the EVPN VXLAN application scenario, NVE devices in the NVE device set are interconnected through a VXLAN tunnel, such that a link between NVE devices in the NVE device set is not limited to a physical direct link. The VXLAN tunnel is used to implement interconnection, such that even if a switching node exists between the NVE devices in the NVE device set, implementation of the EVPN VXLAN is not affected. In addition, when the NVE device in the NVE device set is deployed, the NVE device is not affected by a deployment region and distance, thereby reducing deployment complexity. Further, an interconnection link between the NVE devices in the NVE device set is no longer affected by a physical direct link, thereby helping improve deployment flexibility.

Optionally, based on the descriptions of FIG. 1 in the foregoing embodiment, the EVPN VXLAN further includes a PE device. The PE device and the first NVE device are a pair of BGP peers, the PE device and the second NVE device are a pair of BGP peers, and the PE device and the third NVE device are a pair of BGP peers. A process of establishing a VXLAN tunnel between the PE device and the NVE device set is described below using FIG. 1 as an example. The route processing method further includes the following steps.

S201. The first NVE device sends the first IMET route to the PE device.

S202. The second NVE device sends the second IMET route to the PE device.

S203. The third NVE device sends the third IMET route to the PE device.

Based on the descriptions of FIG. 2A and FIG. 2B in the foregoing embodiment, as NVE devices in the NVE device set, the first NVE device, the second NVE device, and the third NVE device advertise IMET routes to respective BGP peers of the devices. To be more specific, the first NVE device advertises the first IMET route to a BGP peer of the first NVE device, the second NVE device advertises the second IMET route to a BGP peer of the second NVE device, and the third NVE device advertises the third IMET route to a BGP peer of the third NVE device. For implementations of the first IMET route, the second IMET route, and the third IMET route, refer to descriptions of the foregoing embodiment. Details are not described herein again.

S204. The PE device receives the first IMET route, the second IMET route, and the third IMET route.

S205. The PE device establishes a VXLAN tunnel from the PE device to the NVE device set based on the first IMET route, the second IMET route, and the third IMET route.

Because the PE device is a BGP peer of each NVE device in the NVE device set, the PE device can receive the first IMET route, the second IMET route, and the third IMET route. S204 and S205 may be implemented in two possible manners.

In one possible implementation, after receiving the IMET routes sent by all the BGP peers, the PE device establishes a VXLAN tunnel. After receiving the three IMET routes, the PE device parses the three IMET routes separately to obtain common VTEP addresses included in originating router's IP address fields in the three IMET routes. If the PE device determines that the common VTEP addresses included in the originating router's IP address fields in the three IMET routes are the same, the PE device may determine that the NVE devices that send the three IMET routes belong to a same NVE device set. The PE device randomly selects an IMET route from the three IMET routes, and the PE device establishes, using the common VTEP address included in the selected IMET route as a destination endpoint address of a VXLAN tunnel, the VXLAN tunnel from the PE device to a common VTEP including the common VTEP address.

In the other possible implementation, after receiving any IMET route in the three IMET routes, the PE device establishes a VXLAN tunnel. For example, after receiving the first IMET route sent by the first NVE device, the first PE device parses the first IMET route to obtain a common VTEP address included in an originating router's IP address field in the first IMET route. The PE device establishes, using the common VTEP address included in the first IMET route as a destination endpoint address of a VXLAN tunnel, the VXLAN tunnel from the PE device to a common VTEP including the common VTEP address. After the VXLAN tunnel is established, when the PE device receives the second IMET route sent by the second NVE device or the third IMET route sent by the third NVE device, and determines that a common VTEP address included in an originating router's IP address field in the second IMET route or the third IMET route is the same as the common VTEP address used to establish the VXLAN tunnel, the PE device no longer establishes the VXLAN tunnel from the PE device to the common VTEP including the common VTEP address.

In the foregoing two implementations, for an implementation of establishing a VXLAN tunnel, refer to the descriptions of the foregoing embodiments. Details are not described herein again. In the foregoing two implementations, the common VTEP addresses included in the originating router's IP address fields in the three IMET routes are the same. After the PE device receives IMET routes having a same common VTEP address, the PE device considers that only one VTEP corresponding to the common VTEP address exists at a peer end of the PE device. Therefore, the PE device establishes a VXLAN tunnel for the common VTEP address only once, instead of establishing a VXLAN tunnel for the common VTEP address stored in each NVE device in an NVE device set. In this way, a VXLAN tunnel that is from the PE device to the common VTEP including the common VTEP address and that is established by the PE device using the common VTEP address as the destination endpoint address of the VXLAN tunnel may be referred to as a VXLAN tunnel from the PE device to the NVE device set.

Optionally, the three IMET routes each include a VNI. For establishment of a VXLAN tunnel, the VNI is the common VTEP VNI described above. After determining that the three IMET routes include the same common VTEP address, the PE device further determines that the three IMET routes include a same common VTEP VNI, in order to establish the VXLAN tunnel from the PE device to the NVE device set. For explanations of the common VTEP VNI, refer to the corresponding descriptions of the foregoing embodiments. Details are not described herein again.

S206. The PE device sends an IMET route to each of the first NVE device, the second NVE device, and the third NVE device, where a next hop field and an originating router's IP address field that is in the IMET route each include a VTEP address of the PE device, and the VTEP address of the PE device is used to identify a VTEP included in the PE device.

The PE device may advertise the IMET route to a BGP peer of the PE device. For a format and basic usage of the IMET route, refer to descriptions of the RFC 7432. For example, in this embodiment of this application, a value of the VTEP address included in the VTEP of the PE device is set to 4.4.4.4. An example in which the first NVE device receives the IMET route sent by the PE device is used as an example below for description. It should be understood that the second NVE device and the third NVE device may perform a same processing process.

S207. The first NVE device receives the IMET route from the PE device.

S208. The first NVE device establishes a VXLAN tunnel from the first NVE device to the PE device based on the VTEP address from the PE device, where the VTEP address of the PE device is not the same as a common VTEP address stored in the first NVE device.

After receiving the IMET route sent by the PE device, the first NVE device parses the IMET route to obtain the VTEP address of the PE device that is carried in the originating router's IP address field in the IMET route, and establishes the VXLAN tunnel from the first NVE device to the PE device using the VTEP address as a destination endpoint address of the VXLAN tunnel. Optionally, the IMET route further includes a common VTEP VNI. The first NVE device obtains the common VTEP VNI, and establishes a VXLAN tunnel that corresponds to the common VTEP VNI and that is from the first NVE device to the PE device.

Optionally, after obtaining the VTEP address of the PE device, the first NVE device may perform a similar determining process as S103 and S104. To be more specific, if the first NVE device determines that the VTEP address of the PE device is different from the common VTEP address stored in the first NVE device, the first NVE device may determine that the first NVE device and the PE device do not belong to a same NVE device set. The first NVE device establishes the VXLAN tunnel from the first NVE device to the PE device using the common VTEP address as a source endpoint address, instead of establishing the VXLAN tunnel from the first NVE device to the PE device using a first VTEP address as the source endpoint address.

Based on S207 and S208, the second NVE device establishes a VXLAN tunnel from the second NVE device to the PE device, and the third NVE device establishes a VXLAN tunnel from the third NVE device to the PE device. With reference to the foregoing, the three VXLAN tunnels established to the PE device by the first NVE device, the second NVE device, and the third NVE device are the same, that is, source endpoint addresses of the three VXLAN tunnels each are the common VTEP address, destination endpoint addresses of the three VXLAN tunnels each are the VTEP address of the PE device, and the three VXLAN tunnels each correspond to the common VTEP VNI. Correspondingly, the PE device establishes a VXLAN tunnel from the PE device to the NVE device set, a source endpoint address is the VTEP address of the PE device, and a destination endpoint address is the common VTEP address. In this way, the PE device considers that only one NVE device exists at the peer end. Actually, the NVE device is the NVE device set. In addition, the first NVE device, the second NVE device, and the third NVE device can still send traffic through the VXLAN tunnels respectively established to the PE device.

Based on the foregoing embodiment, this embodiment of this application may be applied to a network scenario in which more than two NVE devices form an NVE device set. Using FIG. 1 as an example, the NVE device set includes three NVE devices. According to the method shown in FIG. 2A and FIG. 2B, a first VXLAN tunnel is established between the first NVE device and the second NVE device, a second VXLAN tunnel is established between the second NVE device and the third NVE device, and a third VXLAN tunnel is established between the first NVE device and the third NVE device. In this way, according to the technical solution in this application, a network scenario in which one CE device is connected to three or more NVE devices may be implemented, that is, the CE device is multi-homed to three or more NVE devices. Using FIG. 1 as an example, the first CE device is multi-homed to the first NVE device, the second NVE device, and the third NVE device. The foregoing implementation is an All-Active Redundancy Mode of the EVPN VXLAN. To be more specific, a plurality of NVE devices are connected to at least one CE device using ESs, and the plurality of NVE devices form a device set in the active-active redundancy mode and are all used to forward traffic. In comparison, in an existing all-active redundancy mode of the EVPN VXLAN, a dual-active redundancy mode is used, and a CE device can be dual-homed to a maximum of two NVEs. In addition, the two NVE devices are directly connected to each other using a physical link. For example, the two NVE devices are connected to each other using a peer link. Therefore, a further beneficial effect of this embodiment of this application lies in that the active-active redundancy mode supports more NVE devices, thereby helping improve reliability of the EVPN VXLAN and flexibility of network deployment.

Figure 3:
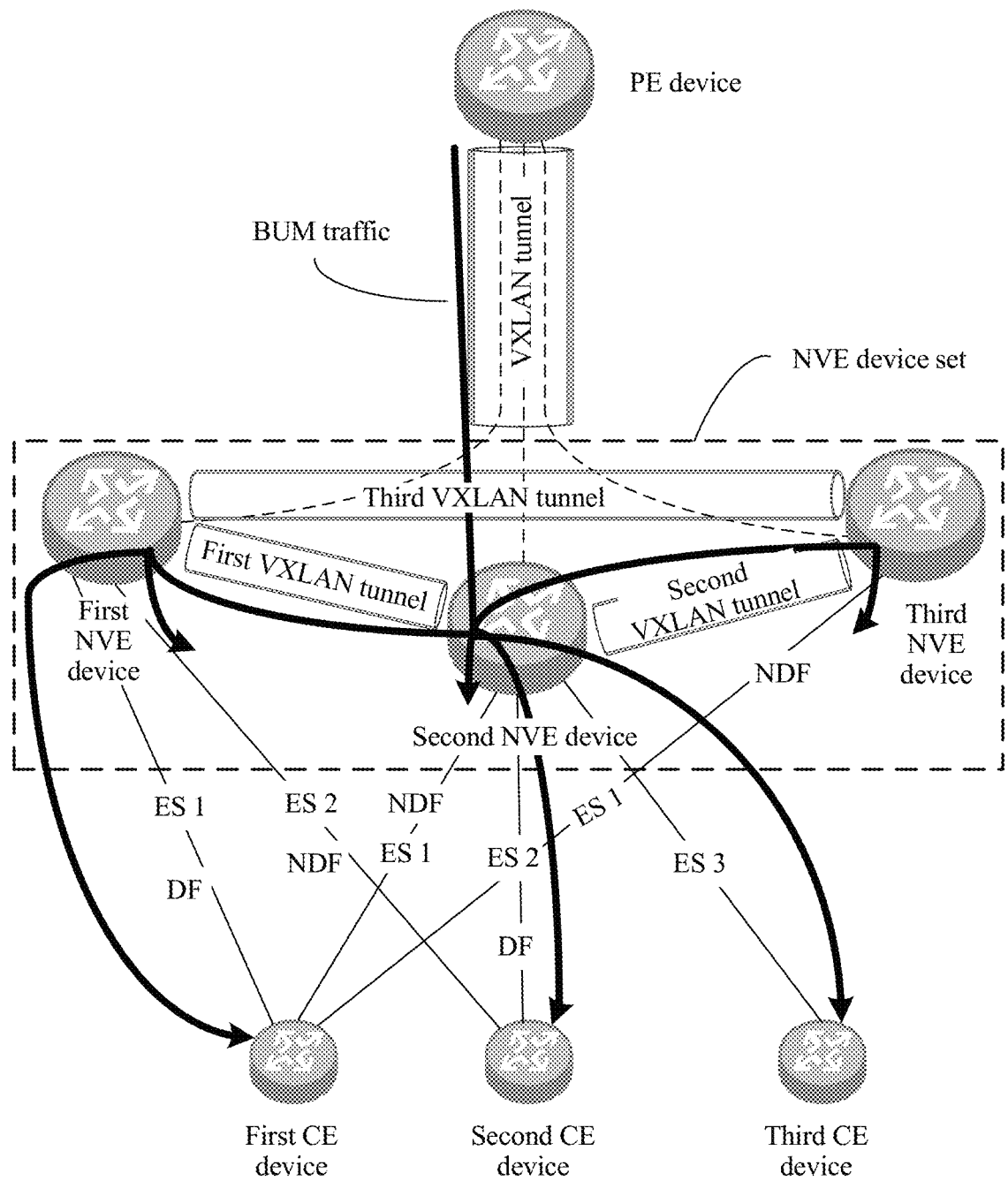
FIG. 3 is a schematic structural diagram of another EVPN VXLAN according to an embodiment of this application.

FIG. 3 is a schematic structural diagram of another EVPN VXLAN according to an embodiment of this application. FIG. 3 shows the following: After a VXLAN tunnel between NVE devices in an NVE device set is established using the technical solution provided in the foregoing embodiments, a designated forwarder (DF) is elected, and Broadcast, Unknown unicast, and Multicast (BUM) traffic are forwarded. FIG. 3 shows three CE devices as an example: a first CE device, a second CE device, and a third CE device. The first CE device is multi-homed to the first NVE device, the second NVE device, and the third NVE device, that is, the first CE device communicates with the first NVE device, the second NVE device, and the third NVE device separately. The second CE device is dual-homed to the first NVE device and the second NVE device, that is, the second CE device communicates with the first NVE device and the second NVE device separately. The third CE device is single-homed to the second NVE device, that is, the third CE device communicates with the second NVE device. An example in which BUM traffic is forwarded from a PE device to the first CE device, the second CE device, and the third CE device is used to describe FIG. 3.

The first CE device is multi-homed to the first NVE device, the second NVE device, and the third NVE device using a plurality of Ethernet links, and therefore the plurality of Ethernet links form an ES, as shown by an ES 1 in FIG. 3. ESI values of ESs 1 of three Ethernet links that connect the first CE device to the first NVE device, the second NVE device, and the third NVE device are a same value. The first NVE device, the second NVE device, and the third NVE device separately send Ethernet segment (ES) routes to respective BGP peers of the devices, and the ES routes are used for DF election. The ES route includes an RD field, an ESI field, an IP address length field, and an originating router's IP address field. Definitions of the fields are similar to that of the foregoing IMET route. Details are not described herein again. In addition, for a format and basic usage of the ES route, refer to descriptions of Chapter 7.4 and Chapter 8.5 of the RFC 7432. Using the first CE device in FIG. 3 as an example, the first NVE device receives ES routes from the second NVE device and the third NVE device. The first NVE device determines, based on the ES routes received from the second NVE device and the third NVE device, the first NVE device as a DF in the ES that includes the plurality of Ethernet links. Likewise, the second NVE device is determined as a non-designated forwarder (NDF) in the ES that includes the plurality of Ethernet links, and the third NVE device is determined as an NDF in the ES that includes the plurality of Ethernet links. As shown in FIG. 3, the ES 1 between the first CE device and the first NVE device is a DF, the ES 1 between the first CE device and the second NVE device is an NDF, and the ES 1 between the first CE device and the third NVE device is an NDF. The second CE device is dual-homed to the first NVE device and the second NVE device using two Ethernet links, and the two Ethernet links form an ES, as shown by an ES 2 in FIG. 3. ESI values of ESs 2 of the two Ethernet links that connect the second CE device to the first NVE device and the second NVE device are a same value. Likewise, the second NVE device is determined as a DF in the ES that includes the two Ethernet links, and the first NVE device is determined as an NDF in the ES that includes the two Ethernet links. The third CE device is single-homed to the second NVE device, and therefore has no DF election process.

The NVE device may send the ES route to a BGP peer of the NVE device in the following manner. The NVE device may send an update message to the BGP peer of the NVE device, and the update message carries an MP_REACH_NLRI attribute. The MP_REACH_NLRI attribute includes an EVPN NLRI field and a next hop field. The EVPN NLRI field is used to carry the ES route.

The PE device sends BUM traffic to an NVE device set based on a VXLAN tunnel. For example, the PE device sends a VXLAN packet to the NVE device set according to a hash rule, and the VXLAN packet carries the BUM traffic. Optionally, the VXLAN packet further carries a BUM mark, and the BUM mark is used to identify that traffic carried in the VXLAN packet is the BUM traffic. In a possible implementation, the BUM mark may be carried in a VXLAN header in the VXLAN packet.

An example in which the VXLAN packet is hashed to the second NVE device is used for description. In this embodiment and a subsequent embodiment, to distinguish between the VXLAN packet transmitted between the PE device and the NVE device set and a VXLAN packet transmitted between NVE devices in the NVE device set, the VXLAN packet transmitted between the PE device and the NVE device set is named as a PE VXLAN packet. The second NVE device receives the PE VXLAN packet from the PE device, parses the PE VXLAN packet, and may determine, based on the BUM mark carried in the PE VXLAN packet, that traffic carried in the PE VXLAN packet is BUM traffic. The second NVE device forwards the BUM traffic to a CE device that has a connection relationship with the second NVE device, and the second NVE device further forwards the BUM traffic to another NVE device in the NVE device set.

That the second NVE device forwards the BUM traffic to a CE device that has a connection relationship with the second NVE device includes the following: The second NVE device determines that the ES 2 between the second NVE device and the second CE device is in a DF state, and the second NVE device transmits the BUM traffic to an outbound interface that connects the second NVE device and the ES 2, and sends the BUM traffic to the second CE device using the ES 2. The second NVE device determines that the ES 1 between the second NVE device and the first CE device is in an NDF state, and the second NVE device does not transmit the BUM traffic to an outbound interface that connects the second NVE device and the ES 1, such that the second NVE device avoids sending the BUM traffic to the first CE device using the ES 1. In addition, the second NVE device determines that an ES 3 between the second NVE device and the third CE device does not have a DF or an NDF state, and directly sends the BUM traffic to the third CE device using the ES 3.

That the second NVE device forwards the BUM traffic to another NVE device in the NVE device set includes the following: The second NVE device parses the PE VXLAN packet from the PE device to obtain the BUM traffic. The second NVE device determines that the BUM traffic is from the PE device, encapsulates the BUM traffic as a VXLAN packet, sends the VXLAN packet to the first NVE device through a first VXLAN tunnel, and sends the VXLAN packet to the second NVE device through a second VXLAN tunnel.

After receiving the VXLAN packet through the first VXLAN tunnel, the first NVE device can determine that the BUM traffic in the VXLAN packet is received through the first VXLAN tunnel, and no longer forwards the BUM traffic to a third VXLAN tunnel connected to the first NVE device. As shown in FIG. 3, after receiving the VXLAN packet through the first VXLAN tunnel, the first NVE device parses the VXLAN packet to obtain the BUM traffic, and no longer forwards the BUM traffic to the third NVE device through a third VXLAN tunnel. To be more specific, the first NVE device avoids forwarding the BUM traffic to the third NVE device through the VXLAN tunnel from the first NVE device to the third NVE device, based on that the BUM traffic is received through the first VXLAN tunnel. A beneficial effect based on the foregoing lies in that the BUM traffic is prevented from being dual-transmitted.

After receiving the VXLAN packet through the first VXLAN tunnel, the first NVE device parses the VXLAN packet to obtain the BUM traffic, and further sends the BUM traffic to a CE device connected to the first NVE device. As shown in FIG. 3, the first NVE device determines that the ES 1 between the first NVE device and the first CE device is in a DF state, and the first NVE device transmits the BUM traffic to an outbound interface that connects the first NVE device and the ES 1, and sends the BUM traffic to the first CE device using the ES 1. The first NVE device determines that the ES 2 between the first NVE device and the second CE device is in an NDF state, and the first NVE device does not send the BUM traffic to an outbound interface that connects the first NVE device and the ES 2, such that the first NVE device avoids sending the BUM traffic to the second CE device using the ES 2.

After receiving the VXLAN packet through the second VXLAN tunnel, the third NVE device parses the VXLAN packet to obtain the BUM traffic. In one aspect, the third NVE device avoids forwarding the BUM traffic to the first NVE device through the third VXLAN tunnel. In another aspect, the third NVE device determines that the ES 1 between the third NVE device and the first CE device is in an NDF state, and the third NVE device does not transmit the BUM traffic to an outbound interface that connects the third NVE device and the ES 1, such that the third NVE device avoids sending the BUM traffic to the first CE device using the ES 1.

In the foregoing implementation, not only BUM traffic can be normally forwarded through a VXLAN tunnel between NVE devices, but also forwarding of the BUM traffic to a VXLAN tunnel between other NVE devices can be avoided, in order to avoid dual transmission of the BUM traffic.

Likewise, a processing of forwarding BUM traffic from a CE device to a PE device and another CE device is an inverse process of the foregoing implementation. Therefore, forwarding of the BUM traffic may be completed by referring to the foregoing manner. For example, BUM traffic is forwarded from the second CE device to the PE device, the first CE device, and the third CE device. The BUM traffic arrives at the second NVE device using the ES 2 between the second NVE device and the second CE device. The second NVE device encapsulates the BUM traffic as a PE VXLAN packet, and forwards the PE VXLAN packet to the PE device through a VXLAN tunnel between the second NVE device and the PE device. The second NVE device further encapsulates the BUM traffic as a VXLAN packet, and forwards the VXLAN packet to the first NVE device and the third NVE device through the first VXLAN tunnel and the second VXLAN tunnel respectively. The second NVE device further directly forwards the BUM traffic to the third CE device using the ES 3, but avoids forwarding the BUM traffic to the first CE device using the ES 1 between the second NVE device and the first CE device. After receiving the BUM traffic from the second NVE device, the first NVE device avoids forwarding the BUM traffic to the third NVE device through the third VXLAN tunnel, and avoids forwarding the BUM traffic to the PE device through the VXLAN tunnel. The first NVE device forwards the BUM traffic to the first CE device using the ES 1, but avoids forwarding the BUM traffic to the second CE device using the ES 2. After receiving the BUM traffic from the second NVE device, the third NVE device avoids forwarding the BUM traffic to the first NVE device through the third VXLAN tunnel, avoids forwarding the BUM traffic to the first CE device using the ES 1, and further avoids forwarding the BUM traffic to the PE device through the VXLAN tunnel.

Figure 4:
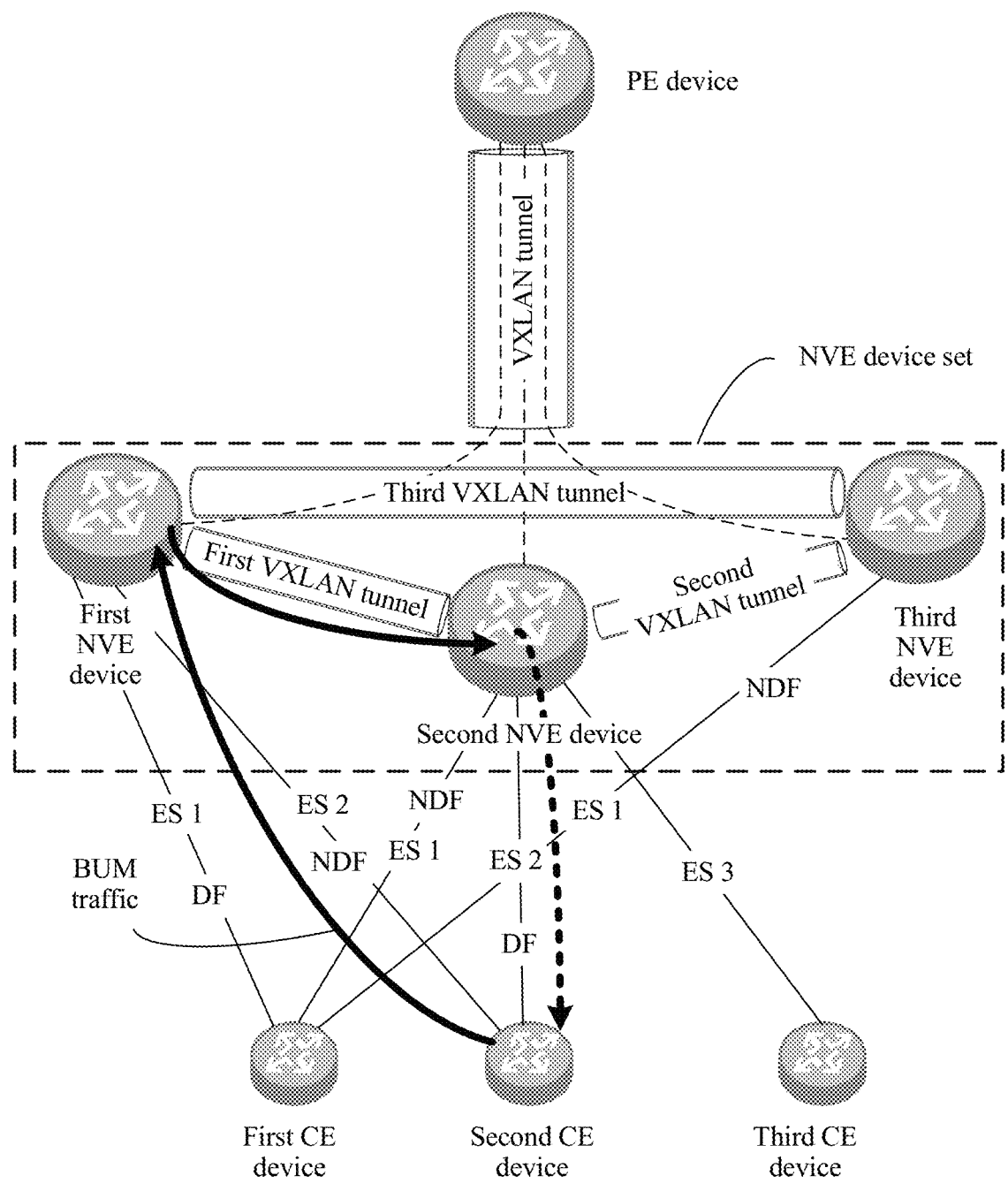
FIG. 4 is a schematic structural diagram of still another EVPN VXLAN according to an embodiment of this application.

In the foregoing enumerated process in which the BUM traffic is forwarded from the second CE device to the PE device, the first CE device, and the third CE device, the BUM traffic sent by the second CE device arrives at the second NVE device using the ES 2 between the second NVE device and the second CE device. However, in an actual scenario, the BUM traffic sent by the second CE device may arrive at the first NVE device using the ES 2 between the first NVE device and the second CE device, because the second CE device does not care about a DF state or an NDF state of a communication link. As shown in FIG. 4, when the second CE device forwards the BUM traffic to the first NVE device using the ES 2, the first NVE device encapsulates the BUM traffic as a VXLAN packet, and forwards the VXLAN packet to the second NVE device through the first VXLAN tunnel. Because the ES 2 between the second NVE device and the second CE device is in a DF state, the second NVE device forwards the BUM traffic to the second CE device using the ES 2, as shown by a dashed line arrow between the second NVE device and the second CE device in FIG. 4. In this way, the second CE device, the first NVE device, and the second NVE device form a BUM traffic loop. It should be understood that to more clearly present a loop problem, a BUM traffic forwarding line shown in FIG. 4 is only a part at which a loop occurs, and FIG. 4 does not show an entire forwarding line of the BUM traffic in the EVPN VXLAN.

A method for resolving the problem of the BUM traffic loop including the second CE device, the first NVE device, and the second NVE device is described below with reference to FIG. 4. The second CE device is dual-homed to the first NVE device and the second NVE device using two Ethernet links, and the two Ethernet links form an ES, as shown by an ES 2 in FIG. 4. ESI values of ESs 2 of the two Ethernet links that connect the second CE device to the first NVE device and the second NVE device are a same value. The second NVE device determines, based on an ES route received from the first NVE device, the second NVE device as a DF in the ES that includes the two Ethernet links.

S301. The second NVE device sends an Ethernet Auto-Discovery (A-D) per Ethernet segment (ES) route to the first NVE device, where the Ethernet A-D per ES route carries an ESI label allocated by the second NVE device to an Ethernet link between the second CE device and the second NVE device.

S302. The first NVE device receives the Ethernet A-D per ES route.

Because the first NVE device and the second NVE device are a pair of BGP peers, the second NVE device can send the Ethernet A-D per ES route to the first NVE device. The Ethernet A-D per ES route is an Ethernet Auto-Discovery route. For a format and basic usage of the Ethernet Auto-Discovery route, refer to descriptions of Chapter 7.1 and Chapter 8.2 of the RFC 7432. The Ethernet A-D per ES route may carry an ESI label extended community attribute, and the ESI label extended community attribute may carry the ESI label. After receiving the Ethernet A-D per ES route, the first NVE device may determine, based on an ESI included in the Ethernet A-D per ES route, that the second CE device is not only connected to the first NVE device, but also connected to the second NVE device. In addition, the first NVE device may determine, based on the ESI label carried in the Ethernet A-D per ES route, a value of the ESI label allocated by the second NVE device to the Ethernet link between the second CE device and the second NVE device.

The NVE device may send the Ethernet A-D per ES route to a BGP peer of the NVE device in the following manner. The NVE device may send an update message to the BGP peer of the NVE device, and the update message carries an MP_REACH_NLRI attribute. The MP_REACH_NLRI attribute includes an EVPN NLRI field and a next hop field. The EVPN NLRI field is used to carry the Ethernet A-D per ES route.

S303. The first NVE device sends a VXLAN packet to the second NVE device through the first VXLAN tunnel, where an original Ethernet payload in the VXLAN packet includes BUM traffic, the VXLAN packet carries the ESI label, and the BUM traffic is from the CE device.

S304. The second NVE device receives, through the first VXLAN tunnel, the VXLAN packet sent by the first NVE device.

As shown in FIG. 4, when the second CE device forwards the BUM traffic to the first NVE device using the ES 2, after receiving the BUM traffic, the first NVE device determines an ESI of an ES 1 between the second CE device and the first NVE device, and may further determine that the second CE device is not only connected to the first NVE device, but also connected to the second NVE device. Therefore, the first NVE device encapsulates the BUM traffic as a VXLAN packet. The original Ethernet payload in the VXLAN packet includes the BUM traffic, and the VXLAN packet carries the ESI label. In other words, the VXLAN packet sent by the first NVE device to the second NVE device through the first VXLAN tunnel not only includes the BUM traffic, but also carries the ESI label allocated by the second NVE device to the Ethernet link between the second CE device and the second NVE device. For a definition of the original Ethernet payload, refer to descriptions of the RFC 7348.

Figure 5:
FIG. 5 is a schematic diagram of a format of a VXLAN packet according to an embodiment of this application.

Optionally, the VXLAN packet may carry the ESI label based on a format shown in FIG. 5. As shown in FIG. 5, the VXLAN packet includes a VXLAN tunnel part and the original Ethernet payload, the VXLAN tunnel part includes an outer Eth header (Eth header: Ethernet header), an outer IP header, an outer UDP header, and a VXLAN header, and the original Ethernet payload carries the BUM traffic. The VXLAN packet further includes the ESI label, and the ESI label is encapsulated between the VXLAN header in the VXLAN packet and the original Ethernet payload. In addition, the VXLAN header carries indication information, and the indication information is used to indicate that the VXLAN packet carries the ESI label.

S305. The second NVE device avoids forwarding the BUM traffic to the CE device using an ES between the second CE device and the second NVE device, based on that the VXLAN packet carries the ESI label.

The second NVE device parses the VXLAN packet to obtain the ESI label carried in the VXLAN packet, and may determine, based on the value of the ESI label, that the ESI label is the ESI label allocated by the second NVE device to the Ethernet link between the second CE device and the second NVE device. The second NVE device no longer transmits the BUM traffic to an outbound interface that connects the second NVE device and the ES 2, in order to avoid forwarding the BUM traffic to the CE device using the ES between the second CE device and the second NVE device.

The foregoing method is explained and described using the loop shown in FIG. 4 as an example. It should be understood that the foregoing method is not limited to resolving only the problem of the BUM traffic loop including the second CE device, the first NVE device, and the second NVE device, and can be used to resolve all loop problems generated in an EVPN VXLAN application scenario according to the foregoing method.

In the foregoing implementation, a format of the VXLAN packet is extended, such that the VXLAN packet can carry the ESI label, thereby resolving a loop problem generated in a process of forwarding the BUM traffic.

The EVPN VXLAN in this embodiment of this application may be further used to process a MAC route, such that after a VXLAN tunnel is established according to the method shown in FIG. 2A and FIG. 2B, the EVPN VXLAN may be used to guide forwarding of unicast traffic. A method for processing a MAC route using the EVPN VXLAN is described below with reference to FIG. 1. The second CE device is dual-homed to the first NVE device and the second NVE device using two Ethernet links, and the two Ethernet links form an ES. ESI values of ESs 2 of the two Ethernet links that connect the second CE device to the first NVE device and the second NVE device are a same value.

S401. The first NVE device receives a MAC/IP advertisement route from the second NVE device, where the MAC/IP advertisement route includes a (MAC-VLAN ID, the MAC-VLAN ID is used to indicate a VLAN to which a MAC address carried in the MAC/IP advertisement route belongs, and the MAC address carried in the MAC/IP advertisement route is a MAC address of the CE device, or the MAC address carried in the MAC/IP advertisement route is a MAC address of a host in an EVPN site administered by the CE device.

Because the first NVE device and the second NVE device are a pair of BGP peers, the second NVE device can send the MAC/IP advertisement route to the first NVE device. Correspondingly, the first NVE device receives the MAC/IP advertisement route from the second NVE device. For a format and basic usage of the MAC/IP advertisement route, refer to descriptions of Chapter 7.2, Chapter 9, and Chapter 14 of the RFC 7432. In this embodiment of this application, a MAC/IP advertisement route described in the RFC 7432 is extended, such that the MAC/IP advertisement route can carry the MAC-VLAN ID. The MAC-VLAN ID is used to indicate the VLAN to which the MAC address carried in the MAC/IP advertisement route belongs. The MAC address is used to identify the second CE device, or the MAC address is used to identify a host connected to the second CE device. The host is a physical device or a VM.

Optionally, a new attribute is extended in this embodiment of this application to carry the MAC-VLAN ID. As shown in FIG. 8, a MAC-VLAN attribute is extended in this embodiment of this application to carry the MAC-VLAN ID. A type field and a sub type field are used to indicate a type of the MAC-VLAN attribute, and specific values of the type field and the sub type field each may be set according to a requirement of a standard organization. A flag field may be used to indicate whether the MAC-VLAN ID in the MAC-VLAN attribute is allowed to be read. For example, if the flag field is 0, it indicates that the MAC-VLAN ID in the MAC-VLAN attribute is not allowed to be read; or if the flag field is 1, it indicates that the MAC-VLAN ID in the MAC-VLAN attribute is allowed to be read. It should be understood that the foregoing functions of the flag field are an example, and a function of the flag field may correspondingly change based on a use scenario. The MAC-VLAN ID field is used to carry a value of the MAC-VLAN ID. A reserved field is used to implement further extension. The MAC-VLAN attribute may be carried in the MAC/IP advertisement route as an attribute, in order to implement the solution in this embodiment of this application.

S402. The first NVE device determines, based on an ESI and the MAC-VLAN ID that are carried in the MAC/IP advertisement route, a local interface that is of the first NVE device and that connects to an Ethernet link between the second CE device and the first NVE device, where the ESI carried in the MAC/IP advertisement route is used to indicate an ES between the second CE device and the second NVE device.

The MAC/IP advertisement route sent by the second NVE device to the first NVE device includes an ESI field, and the ESI field is used to carry the ESI that indicates the Ethernet link between the second CE device and the second NVE device. An ESI value of an ES 2 between the second CE device and the first NVE device is equal to an ESI value of an ES 2 between the second CE device and the second NVE device. Therefore, the first NVE device can determine, based on the ESI and the MAC-VLAN ID that are carried in the MAC/IP advertisement route, the local interface that is of the first NVE device and that connects the Ethernet link between the second CE device and the first NVE device. In other words, the first NVE device may determine a local interface on the first NVE device based on the ESI and the MAC-VLAN ID, and the local interface is used to communicate with a device identified by the MAC address carried in the MAC/IP advertisement route.

S403. A control plane of the first NVE device sends a first MAC entry to a forwarding plane of the first NVE device, where an outbound interface in the first MAC entry is the local interface of the first NVE device, and the first MAC entry includes the MAC address and the MAC-VLAN ID that are carried in the MAC/IP advertisement route.

The first NVE device delivers, from the control plane of the first NVE device to the forwarding plane of the first NVE device, the first MAC entry that includes the MAC address and the MAC-VLAN ID, such that the first NVE device can guide, based on the first MAC entry, forwarding of unicast traffic. The outbound interface in the first MAC entry is a local interface that is of the first NVE device and that connects to an Ethernet link between the second CE device and the first NVE device.

For example, as shown in FIG. 1, the PE device sends unicast traffic to the second CE device. It is assumed that the PE device hashes the unicast traffic to the second NVE device. The second NVE device receives a VXLAN packet from the PE device, and the VXLAN packet carries the unicast traffic. The second NVE device obtains the unicast traffic in the VXLAN packet, and forwards the unicast traffic to the second CE device based on a MAC entry stored in the second NVE device.

Figure 9:
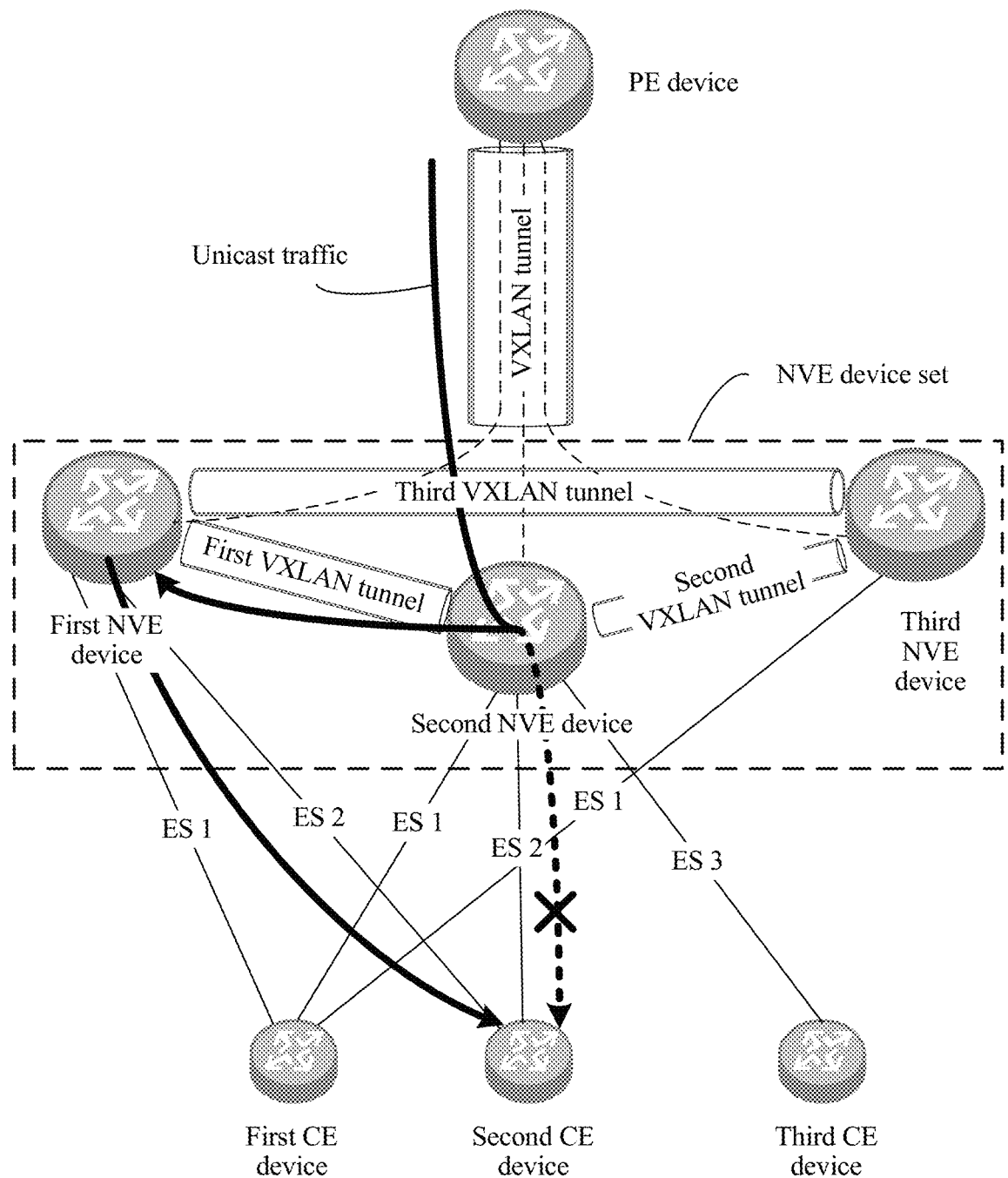
FIG. 9 is a schematic structural diagram of still another EVPN VXLAN according to an embodiment of this application.

As shown in FIG. 9, if the ES 2 between the second NVE device and the second CE device is faulty, the unicast traffic cannot arrive at the second CE device using the ES 2 between the second NVE device and the second CE device, as shown by a dashed line arrow in FIG. 9. The first NVE device and the second NVE device have performed S401 to S403. Therefore, the first NVE device has delivered, from the control plane of the first NVE device to the forwarding plane of the first NVE device, the first MAC entry that includes the MAC address and the MAC-VLAN ID. The second NVE device sends, to the first NVE device through the first VXLAN tunnel, the VXLAN packet that carries the unicast traffic. After receiving the VXLAN packet, the first NVE device obtains the unicast traffic, and forwards the unicast traffic to the second CE device based on the first MAC entry using the ES 2 between the first NVE device and the second CE device.

In the foregoing implementation, a forwarding path may be redirected using the MAC/IP advertisement route and a VXLAN tunnel between NVE devices, such that when a link fault occurs on an Ethernet link, normal forwarding of unicast traffic can still be ensured. The foregoing method is described using an example in which a CE device is dual-homed to two NVE devices. It should be understood that the foregoing method may also be applied to a scenario in which a CE device is multi-homed to more than two NVE devices.

Optionally, the foregoing MAC route processing method further includes the following step.

S404. The MAC/IP advertisement route is carried in MP_REACH_NLRI, a next hop field in the MP_REACH_NLRI includes a common VTEP address, the MAC/IP advertisement route further includes the second VTEP address, and the common VTEP address included in the next hop field in the MP_REACH_NLRI is the same as the common VTEP address included in the originating router's IP address field in the second IMET route. The method further includes the following: The control plane of the first NVE device sends a second MAC entry to the forwarding plane of the first NVE device based on the common VTEP address included in the next hop field in the MP_REACH_NLRI and the second VTEP address included in the MAC/IP advertisement route, where an outbound interface in the second MAC entry is a local interface that is of the first NVE device and that connects to the VXLAN tunnel from the first NVE device to the second NVE device, and the second MAC entry includes the MAC address carried in the MAC/IP advertisement route.

The second NVE device may send the MAC/IP advertisement route to the first NVE device in the following manner. The second NVE device may send an update message to the first NVE device, and the update message carries an MP_REACH_NLRI attribute. The MP_REACH_NLRI attribute includes an EVPN NLRI field and the next hop field. The EVPN NLRI field is used to carry the MAC/IP advertisement route. The next hop field includes the common VTEP address, and the MAC/IP advertisement route further includes the second VTEP address. The second NVE device may determine, based on the common VTEP address, that the first NVE device and the second NVE device belong to a same NVE device set. The second NVE device may determine, based on the second VTEP address, that the MAC/IP advertisement route is advertised by the second NVE device. The first NVE device sends the second MAC entry to the forwarding plane of the first NVE device. The outbound interface in the second MAC entry is the local interface that is of the first NVE device and that connects to the VXLAN tunnel from the first NVE device to the second NVE device, and the second MAC entry includes the MAC address carried in the MAC/IP advertisement route.

For example, as shown in FIG. 1, the PE device sends unicast traffic to the second CE device. It is assumed that the PE device hashes the unicast traffic to the first NVE device. The first NVE device receives a PE VXLAN packet from the PE device, and the PE VXLAN packet carries the unicast traffic. The first NVE device obtains the unicast traffic in the PE VXLAN packet, and forwards the unicast traffic to the second CE device based on a MAC entry stored in the first NVE device and using the ES 2 between the first NVE device and the second CE device. In addition, the first NVE device has sent the second MAC entry to the forwarding plane of the first NVE device. The outbound interface in the second MAC entry is the local interface that is of the first NVE device and that connects to the VXLAN tunnel from the first NVE device to the second NVE device, and the second MAC entry includes the MAC address. Therefore, the first NVE device may forward the unicast traffic to the second NVE device through the first VXLAN tunnel. The second NVE device forwards the unicast traffic to the second CE device based on the MAC entry stored in the second NVE device and using the ES 2 between the second NVE device and the second CE device.

In the foregoing implementation, load sharing of the unicast traffic may be further implemented, thereby helping increase transmission bandwidth of the unicast traffic.

The foregoing MAC route processing is applicable to a scenario in which a CE device is connected to two NVE devices through dual homing, or a scenario in which a CE device is multi-homed to more than two NVE devices. A method for processing a MAC route using the EVPN VXLAN used in a scenario in which a CE device is single-homed to one NVE device is described below with reference to FIG. 1. As shown in FIG. 1, the third CE device is homed to the second NVE device.

S501. The first NVE device receives a MAC/IP advertisement route from the second NVE device, where the MAC/IP advertisement route is carried in MP_REACH_NLRI, a next hop field in the MP_REACH_NLRI includes a common VTEP address, the MAC/IP advertisement route includes a MAC-VLAN ID and the second VTEP address, the MAC-VLAN ID is used to indicate a VLAN to which a MAC address carried in the MAC/IP advertisement route belongs, and the MAC address carried in the MAC/IP advertisement route is a MAC address of the CE device, or the MAC address carried in the MAC/IP advertisement route is a MAC address of a host in an EVPN site administered by the CE device.

For an execution process in S501, refer to the corresponding explanations of S401 in the foregoing embodiment. Details are not described herein again.

S502. The first NVE device determines, based on an ESI and the MAC-VLAN ID that are carried in the MAC/IP advertisement route, that the first NVE device has no local interface that connects to an Ethernet link between the CE device and the first NVE device, where the ESI carried in the MAC/IP advertisement route is used to indicate an ES between the CE device and the second NVE device.

With reference to the corresponding explanations of S402 in the foregoing embodiment, because the third CE device is connected to the second NVE device through single homing, an ESI value of an ES 3 between the second NVE device and the third CE device is 0 or an invalid value. After receiving the MAC/IP advertisement route from the second NVE device, the first NVE device obtains the ESI carried in the MAC/IP advertisement route. If the first NVE device finds that the ESI value is 0 or an invalid value, the first NVE device considers that the ESI does not exist. Therefore, the first NVE device determines, based on the ESI and the MAC-VLAN ID that are carried in the MAC/IP advertisement route, that the first NVE device has no local interface that connects to the Ethernet link between the CE device and the first NVE device.

S503. A control plane of the first NVE device sends a MAC entry to a forwarding plane of the first NVE device based on the common VTEP address included in the next hop field in the MP_REACH_NLRI and the second VTEP address included in the MAC/IP advertisement route. An outbound interface in the MAC entry is a local interface that is of the first NVE device and that connects to the VXLAN tunnel from the first NVE device to the second NVE device. The MAC entry includes the MAC address carried in the MAC/IP advertisement route.

The first NVE device performs S503 after determining that the first NVE device has no local interface that connects to the Ethernet link between the CE device and the first NVE device does not exist. For an execution process in S503, refer to the corresponding explanations of S404 in the foregoing embodiment. Details are not described herein again.

Figure 10:
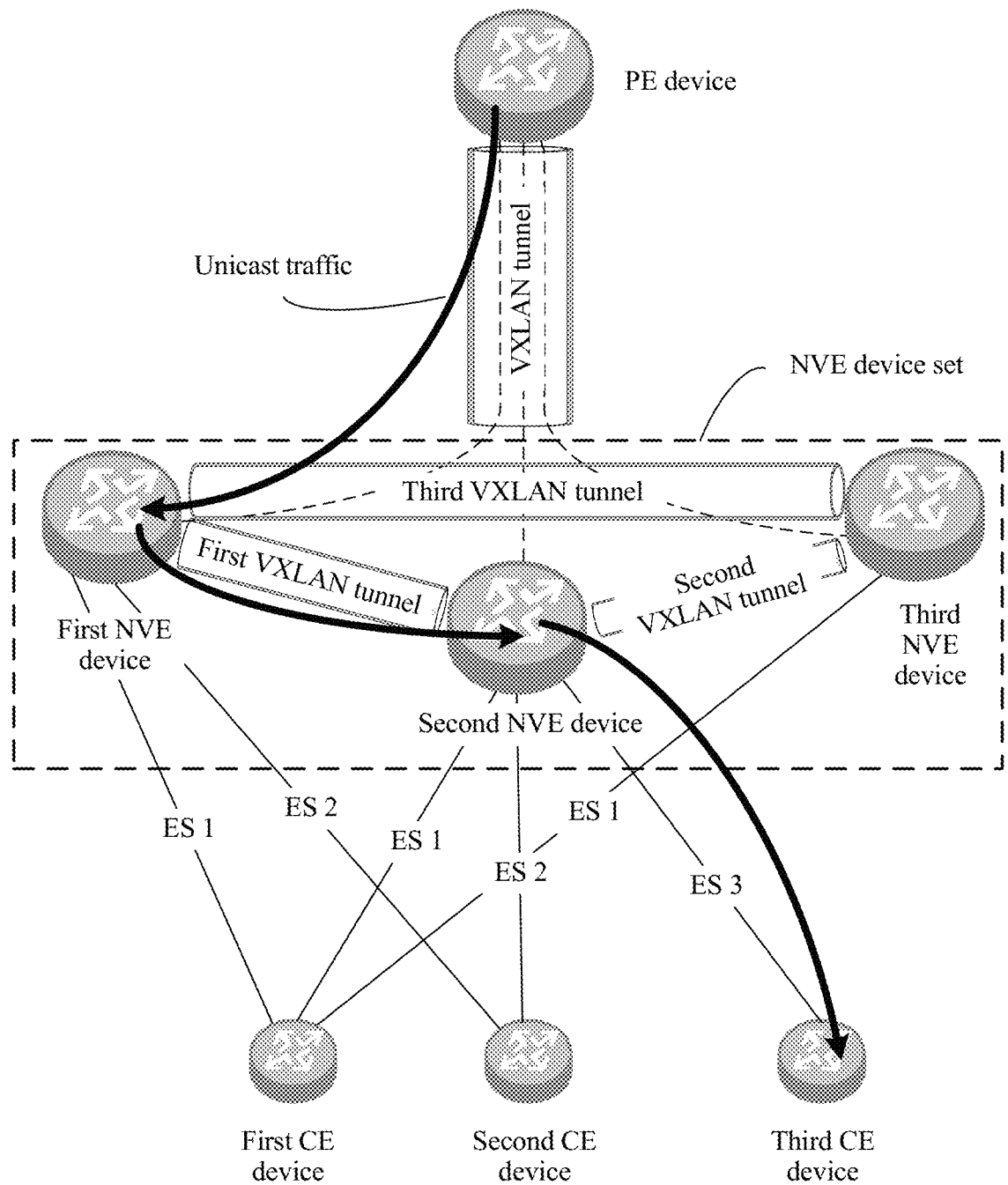
FIG. 10 is a schematic structural diagram of still another EVPN VXLAN according to an embodiment of this application.

For example, as shown in FIG. 10, the PE device sends unicast traffic to the third CE device. It is assumed that the PE device hashes the unicast traffic to the first NVE device. The first NVE device receives a PE VXLAN packet from the PE device, and the PE VXLAN packet carries the unicast traffic. The first NVE device obtains the unicast traffic in the PE VXLAN packet, and the first NVE device locally does not find a MAC entry from the first NVE device to the third CE device. The first NVE device has performed S501 to S503, and therefore the first NVE device may forward the unicast traffic to the second NVE device through the first VXLAN tunnel. The second NVE device forwards the unicast traffic to the third CE device based on a MAC entry stored in the second NVE device and using an ES 3 between the second NVE device and the third CE device.

In the foregoing implementation, it can be ensured that the CE device connected to the NVE device through single homing can normally receive the unicast traffic.

The EVPN VXLAN in this embodiment of this application may be further applied to a layer 3 forwarding scenario. As shown in FIG. 1, Virtual Routing and Forwarding (VRF) instances are separately deployed on the PE device, the first NVE device, the second NVE device, and the third NVE device. In this embodiment, for ease of description, the VRF instances deployed on the PE device, the first NVE device, the second NVE device, and the third NVE device are set to a same VRF instance. It should be understood that a plurality of VRF instances may be configured on each of the devices, for example, different VRF instances correspond to different services. The first NVE device, the second NVE device, and the third NVE device advertise IP prefix routes to respective BGP peers of the devices. The IP prefix route includes an RD field, an ESI field, an Ethernet tag ID field, an IP prefix length field, an IP prefix field, a gateway (GW) IP address field, and an MPLS label field. Definitions of the foregoing fields are similar to the definitions in the foregoing embodiments of this application. The IP prefix field is used to indicate an IP address of a CE device or of a host connected to a CE device. The MPLS label field is used to indicate a layer 3 VNI, and the layer 3 VNI corresponds to a VRF instance. The GW IP address field is set to 0, that is, an invalid value.

The NVE device may send the IP prefix route to a BGP peer of the NVE device in the following manner. The NVE device may send an update message to the BGP peer of the NVE device, and the update message carries an MP_REACH_NLRI attribute. The MP_REACH_NLRI attribute includes an EVPN NLRI field and a next hop field. The EVPN NLRI field is used to carry the IP prefix route.

In this embodiment, the next hop field in the MP_REACH_NLRI attribute that carries the IP prefix route and that is advertised by each of the first NVE device, the second NVE device, and the third NVE device includes the common VTEP address in the foregoing embodiment. As an extension of the IP prefix route, the IP prefix route further carries a VTEP address of an NVE device that sends the IP prefix route. Further, optionally, the IP prefix route may carry the VXLAN attribute described in the foregoing embodiment, and the VXLAN attribute carries a VTEP address. In a process of processing the IP prefix route, an IP route can be learned of and an IP routing entry can be delivered to a forwarding plane, in order to guide layer 3 forwarding of data traffic. The IP prefix route processing process and the layer 3 traffic forwarding process in this embodiment each are similar to the MAC route processing method in the foregoing embodiment. Details are not described herein again.

Figure 11:
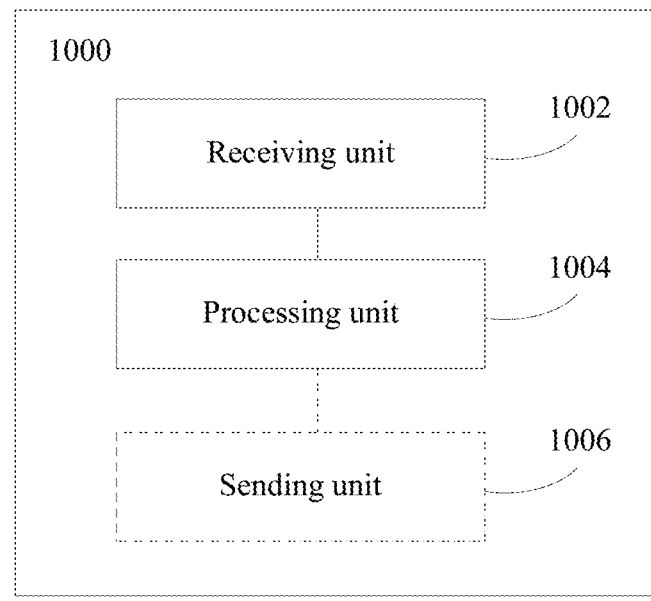
FIG. 11 is a schematic structural diagram of a first NVE device according to an embodiment of this application.

FIG. 11 is a schematic structural diagram of a first NVE device 1000 according to an embodiment of this application. The first NVE device 1000 shown in FIG. 11 may perform corresponding steps performed by the first NVE device in the method in the foregoing embodiment. As shown in FIG. 11, the first NVE device 1000 includes a receiving unit 1002 and a processing unit 1004.

The receiving unit 1002 is configured to receive a second IMET route from the second NVE device. An originating router's IP address field in the second IMET route includes a common VTEP address, the second IMET route further includes a second VTEP address, and the common VTEP address included in the originating router's IP address field in the second IMET route is different from the second VTEP address.

The processing unit 1004 is configured to determine whether the common VTEP address included in the originating router's IP address field in the second IMET route is the same as a common VTEP address stored in the first NVE device. The first NVE device can send, to a BGP peer of the first NVE device, an IMET route whose originating router's IP address field carries the common VTEP address stored in the first NVE device. The common VTEP address included in the originating router's IP address field in the second IMET route is the same as the common VTEP address stored in the first NVE device.

When the processing unit 1004 determines that the common VTEP address included in the originating router's IP address field in the second IMET route is the same as the common VTEP address stored in the first NVE device, the processing unit 1004 is further configured to establish a VXLAN tunnel from the first NVE device to the second NVE device based on the second VTEP address in the second IMET route. Further, optionally, a VXLAN attribute in the second IMET route carries the second VTEP address.

Optionally, the first NVE device further includes a sending unit 1006. The sending unit 1006 is configured to send a first IMET route to the second NVE device. An originating router's IP address field in the first IMET route carries the common VTEP address stored in the first NVE device. The first IMET route further includes a first VTEP address, and the first VTEP address is used by the second NVE device to establish the VXLAN tunnel from the second NVE device to the first NVE device. The common VTEP address stored in the first NVE device is different from the first VTEP address. Optionally, a VXLAN attribute in the first IMET route carries the first VTEP address.

Optionally, the sending unit 1006 is further configured to send the first IMET route to a PE device. The receiving unit 1002 is further configured to receive an IMET route from the PE device. An originating router's IP address field in the IMET route from the PE device carries a VTEP address of the PE device. The processing unit 1004 is further configured to establish a VXLAN tunnel from the first NVE device to the PE device based on the VTEP address of the PE device that is in the IMET route from the PE device. The VTEP address of the PE device is not the same as the common VTEP address stored in the first NVE device.

Optionally, the receiving unit 1002 is further configured to receive a third IMET route from the third NVE device. An originating router's IP address field in the third IMET route includes a common VTEP address. The third IMET route further includes a third VTEP address. The common VTEP address included in the originating router's IP address field in the third IMET route is different from the third VTEP address. The processing unit 1004 is further configured to determine whether the common VTEP address included in the originating router's IP address field in the third IMET route is the same as the common VTEP address stored in the first NVE device. The common VTEP address included in the originating router's IP address field in the third IMET route is the same as the common VTEP address stored in the first NVE device. When the processing unit 1004 determines that the common VTEP address included in the originating router's IP address field in the third IMET route is the same as the common VTEP address stored in the first NVE device, the processing unit 1004 is further configured to establish a VXLAN tunnel from the first NVE device to the third NVE device based on the third VTEP address in the third IMET route. Optionally, a VXLAN attribute in the third IMET route carries the third VTEP address.

Optionally, a CE device is multi-homed to the first NVE device, the second NVE device, and the third NVE device using a plurality of Ethernet links, and the plurality of Ethernet links form an ES. The processing unit 1004 is further configured to determine the first NVE device as a DF in the ES based on ES routes from the second NVE device and the third NVE device.

Optionally, the receiving unit 1002 is further configured to receive, through the VXLAN tunnel from the second NVE device to the first NVE device, BUM traffic sent by the second NVE device. The processing unit 1004 is further configured to avoid forwarding the BUM traffic to the third NVE device through the VXLAN tunnel from the first NVE device to the third NVE device, based on that the BUM traffic is received by the first NVE device through the VXLAN tunnel from the second NVE device to the first NVE device.

Optionally, a CE device is dual-homed to the first NVE device and the second NVE device using a plurality of Ethernet links, and the plurality of Ethernet links form an ES. The processing unit 1004 is further configured to determine the first NVE device as a DF in the ES based on an ES route from the second NVE device. The sending unit 1006 is further configured to send an Ethernet A-D per ES route to the second NVE device. The Ethernet A-D per ES route carries an ESI label allocated by the first NVE device to an Ethernet link between the CE device and the first NVE device. The receiving unit 1002 is further configured to receive, through the VXLAN tunnel from the second NVE device to the first NVE device, a VXLAN packet sent by the second NVE device. An original Ethernet payload in the VXLAN packet includes BUM traffic, the VXLAN packet carries the ESI label, and the BUM traffic is from the CE device. The processing unit 1004 is further configured to avoid, based on that the VXLAN packet carries the ESI label, forwarding the BUM traffic to the CE device using the ES between the CE device and the first NVE device. Further, optionally, the ESI label is encapsulated between a VXLAN header in the VXLAN packet and the original Ethernet payload, where the VXLAN header carries indication information, and where the indication information is used to indicate that the VXLAN packet carries the ESI label.

Optionally, a CE device is dual-homed to the first NVE device and the second NVE device using a plurality of Ethernet links, and the plurality of Ethernet links form an ES. The receiving unit 1002 is further configured to receive a MAC/IP advertisement route from the second NVE device. The MAC/IP advertisement route includes a MAC-VLAN ID, and the MAC-VLAN ID is used to indicate a VLAN to which a MAC address carried in the MAC/IP advertisement route belongs. The MAC address carried in the MAC/IP advertisement route is a MAC address of the CE device, or the MAC address carried in the MAC/IP advertisement route is a MAC address of a host in an EVPN site administered by the CE device. The processing unit 1004 is further configured to determine, based on an ESI and the MAC-VLAN ID that are carried in the MAC/IP advertisement route, a local interface that is of the first NVE device and that connects to an Ethernet link between the CE device and the first NVE device. The ESI carried in the MAC/IP advertisement route is used to indicate the ES between the CE device and the second NVE device. The processing unit 1004 is further configured to trigger sending of a first MAC entry to a forwarding plane of the first NVE device. An outbound interface in the first MAC entry is the local interface of the first NVE device, and the first MAC entry includes a MAC address and the MAC-VLAN ID that are carried in the MAC/IP advertisement route.

Optionally, the MAC/IP advertisement route is carried in MP_REACH_NLRI. A next hop field in the MP_REACH_NLRI includes a common VTEP address. The MAC/IP advertisement route further includes the second VTEP address, and the common VTEP address included in the next hop field in the MP_REACH_NLRI is the same as the common VTEP address included in the originating router's IP address field in the second IMET route. The processing unit 1004 is further configured to trigger sending of a second MAC entry to the forwarding plane of the first NVE device based on the common VTEP address included in the next hop field in the MP_REACH_NLRI and the second VTEP address included in the MAC/IP advertisement route. An outbound interface in the second MAC entry is a local interface that is of the first NVE device and that connects to the VXLAN tunnel from the first NVE device to the second NVE device, and the second MAC entry includes the MAC address carried in the MAC/IP advertisement route.

Optionally, a CE device is connected to the second NVE device. The receiving unit 1002 is further configured to receive a MAC/IP advertisement route from the second NVE device. The MAC/IP advertisement route is carried in MP_REACH_NLRI, a next hop field in the MP_REACH_NLRI includes a common VTEP address, the MAC/IP advertisement route includes a MAC-VLAN ID and the second VTEP address, the MAC-VLAN ID is used to indicate a VLAN to which a MAC address carried in the MAC/IP advertisement route belongs, and the MAC address carried in the MAC/IP advertisement route is a MAC address of the CE device, or the MAC address carried in the MAC/IP advertisement route is a MAC address of a host in an EVPN site administered by the CE device. The processing unit 1004 is further configured to determine, based on an ESI and the MAC-VLAN ID that are carried in the MAC/IP advertisement route, that the first NVE device has no local interface that connects to an Ethernet link between the CE device and the first NVE device. The ESI carried in the MAC/IP advertisement route is used to indicate an ES between the CE device and the second NVE device. The processing unit 1004 is further configured to trigger sending of a MAC entry to a forwarding plane of the first NVE device based on the common VTEP address included in the next hop field in the MP_REACH_NLRI and the second VTEP address included in the MAC/IP advertisement route. An outbound interface in the MAC entry is a local interface that is of the first NVE device and that connects to the VXLAN tunnel from the first NVE device to the second NVE device. The MAC entry includes the MAC address carried in the MAC/IP advertisement route.

The first NVE device shown in FIG. 11 may perform corresponding steps performed by the first NVE device in the method in the foregoing embodiment. This ensures that an EVPN application scenario is not limited by a restriction condition that a physical direct link needs to be used as a link between NVE devices, and helps extend the EVPN application scenario and also helps improve reliability and reduce deployment complexity. It should be understood that the structure in FIG. 11 is also applicable to the second NVE device and the third NVE device in FIG. 1.

Figure 12:
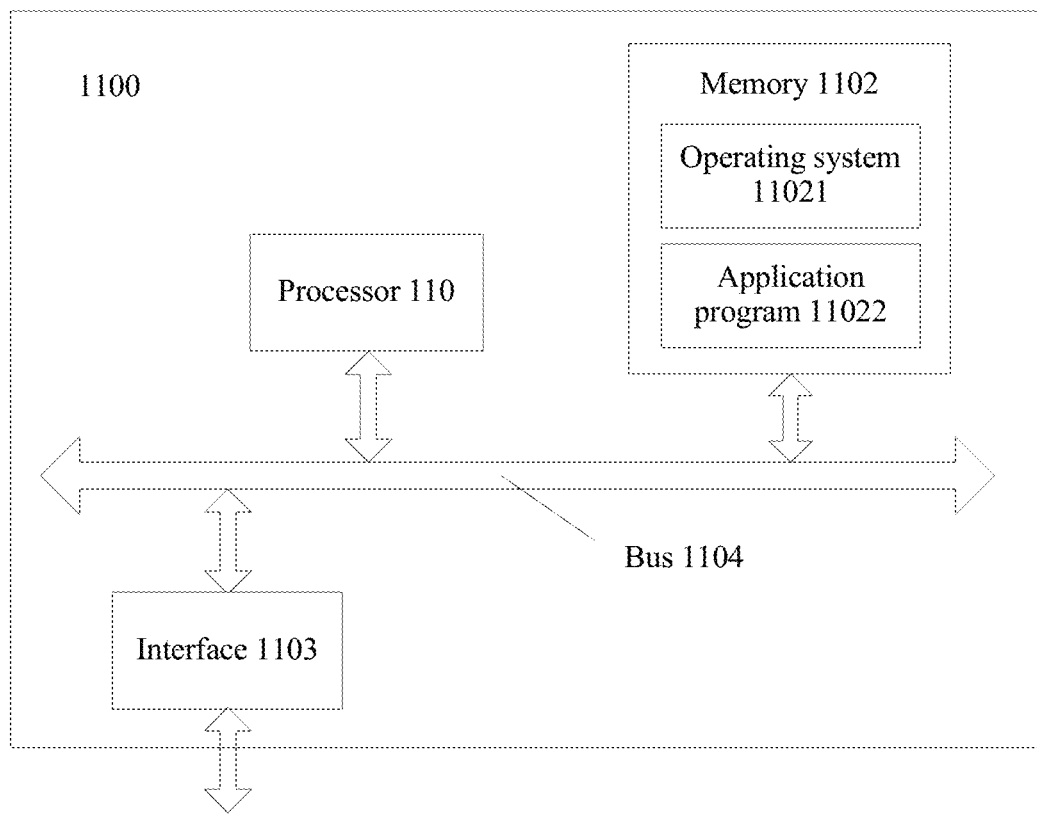
FIG. 12 is a schematic diagram of a hardware structure of a first NVE device according to an embodiment of this application.

FIG. 12 is a schematic diagram of a hardware structure of a first NVE device 1100 according to an embodiment of this application. The first NVE device 1100 shown in FIG. 12 may perform corresponding steps performed by the first NVE device in the method in the foregoing embodiment.

As shown in FIG. 12, the first NVE device 1100 includes a processor 1101, a memory 1102, an interface 1103, and a bus 1104. The interface 1103 may be implemented in a wireless or wired manner. For example, the interface 1103 may be a network adapter. The processor 1101, the memory 1102, and the interface 1103 are connected using the bus 1104.

The interface 1103 may include a transmitter and a receiver, configured for information transmission or receiving between the first NVE device and each of the second NVE device and the third NVE device in the foregoing embodiment; or information transmission or receiving between the first NVE device and a PE device; or information transmission or receiving between the first NVE device and a CE device connected to the first NVE device. For example, the interface 1103 is configured to support processes S102 and S105 in FIG. 2A and FIG. 2B. The processor 1101 is configured to perform processing performed by the first NVE device in the foregoing embodiment. For example, the processor 1101 is configured to: determine whether a common VTEP address included in an originating router's IP address field in a received IMET route is the same as a common VTEP address stored in the memory 1102; establish a VXLAN tunnel based on the VTEP address in the received IMET route and based on that the common VTEP address in the originating router's IP address field in the received IMET route is the same as the common VTEP address stored in the memory 1102; process a received ES route, MAC/IP advertisement route, or Ethernet A-D per ES route; and process BUM traffic or unicast traffic, and/or another process of the technology described in this specification. For example, the processor 1101 is configured to support processes S103 and S104 in FIG. 2A and FIG. 2B. The memory 1102 includes an operating system 11021 and an application program 11022, and is configured to store a program, code, or an instruction. When executing the program, the code, or the instruction, the processor or a hardware device may complete a processing process related to the first NVE device in the method embodiment. Optionally, the memory 1102 may include a read-only memory (ROM) and a random-access memory (RAM). The ROM includes a basic input/output (I/O) system (BIOS) or an embedded system. The RAM includes an application program and an operating system. When the first NVE device 1100 needs to be run, the BIOS or a bootloader in the embedded system that is built into the ROM is used to lead a system to start, and lead the first NVE device 1100 to enter a normal running state. After entering the normal running state, the first NVE device 1100 runs the application program and the operating system in the RAM, in order to complete a processing process related to the first NVE device in the method embodiment.

It may be understood that FIG. 12 merely shows a simplified design of the first NVE device. In actual application, the first NVE device may include any quantity of interfaces, processors, or memories. In addition, only the first NVE device is used as an example for a description of this embodiment. It should be understood that the second NVE device, the third NVE device, or more NVE devices have same functions as the first NVE device. Details are not described herein again.

Figure 13:
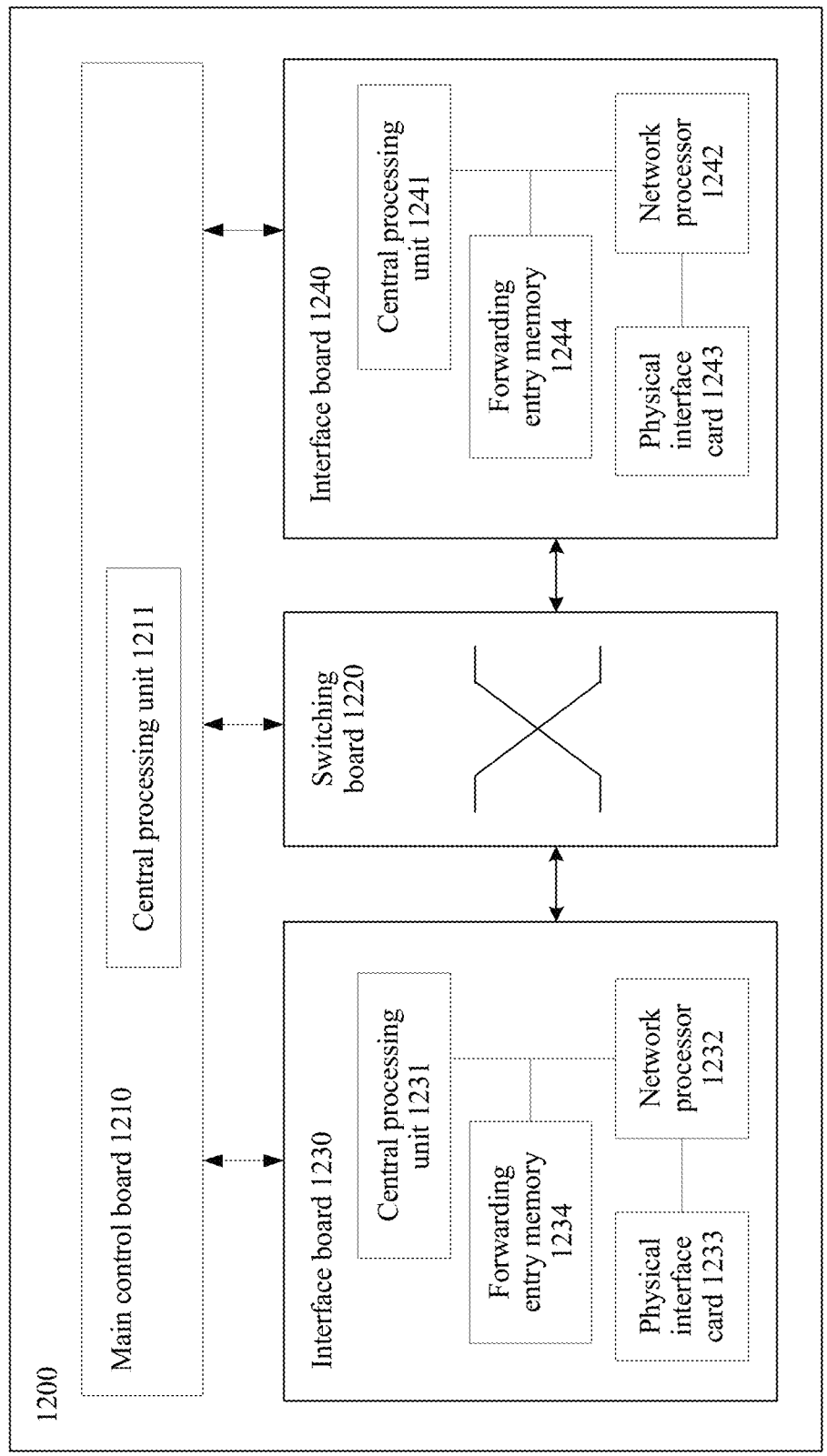
FIG. 13 is a schematic diagram of a hardware structure of another first NVE device according to an embodiment of this application.

FIG. 13 is a schematic diagram of a hardware structure of another first NVE device 1200 according to an embodiment of this application. The first NVE device 1200 shown in FIG. 13 may perform corresponding steps performed by the first NVE device in the method in the foregoing embodiment.

As shown in FIG. 13, the first NVE device 1200 includes a main control board 1210, an interface board 1230, a switching board 1220, and an interface board 1240. The main control board 1210 is configured to complete functions such as system management, device maintenance, and protocol processing. The switching board 1220 is configured to complete data exchange between interface boards (the interface board is also referred to as a line card or a service board). The interface boards 1230 and 1240 are configured to provide various service interfaces (for example, a Packet over Synchronous optical networking (SONET)/synchronous digital hierarchy (SDH) (POS) interface, a Gigabit Ethernet (GE) interface, and an Asynchronous Transfer Mode (ATM) interface), and forward a data packet. The main control board 1210, the interface boards 1230 and 1240, and the switching board 1220 are connected to a system backplane using a system bus to communicate with each other. A central processing unit 1231 on the interface board 1230 is configured to control and manage the interface board, and communicate with a central processing unit on the main control board.

A physical interface card 1233 on the interface board 1230 receives a second IMET route from the second NVE device, and sends the second IMET route to a central processing unit 1211 on the main control board 1210 using the central processing unit 1231 on the interface board 1230.

The central processing unit 1211 on the main control board 1210 is configured to obtain the second IMET route. The central processing unit 1211 is further configured to determine whether a common VTEP address included in an originating router's IP address field in the second IMET route is the same as a common VTEP address stored in the first NVE device. When the central processing unit 1211 determines that the common VTEP address included in the originating router's IP address field in the second IMET route is the same as the common VTEP address stored in the first NVE device, the central processing unit 1211 establishes a virtual extensible local area network VXLAN tunnel from the first NVE device to the second NVE device based on the second VTEP address in the second IMET route. The common VTEP address included in the originating router's IP address field in the second IMET route is different from the second VTEP address.

The central processing unit 1211 on the main control board 1210 is further configured to generate a first IMET route. An originating router's IP address field in the first IMET route carries the common VTEP address stored in the first NVE device. The first IMET route further includes a first VTEP address. The first VTEP address is used by the second NVE device to establish the VXLAN tunnel from the second NVE device to the first NVE device. The common VTEP address stored in the first NVE device is different from the first VTEP address. The central processing unit 1211 on the main control board 1210 sends the generated first IMET route to the physical interface card 1233 using the central processing unit 1231 on the interface board 1230. The physical interface card 1233 on the interface board 1230 sends the first IMET route to a BGP peer of the first NVE device.

The central processing unit 1211 on the main control board 1210 is further configured to obtain, from the physical interface card 1233 on the interface board 1230, ES routes from the second NVE device and the third NVE device. The central processing unit 1211 is further configured to determine the first NVE device as a DF or an NDF in an ES based on the ES routes.

The central processing unit 1211 on the main control board 1210 is further configured to control the interface board 1230 to forward and process BUM traffic or unicast traffic.

The central processing unit 1211 on the main control board 1210 is further configured to: generate an Ethernet A-D per ES route, and send the Ethernet A-D per ES route to the BGP peer of the first NVE device using the physical interface card 1233 on the interface board 1230.

The central processing unit 1211 on the main control board 1210 is further configured to obtain, from the physical interface card 1233 on the interface board 1230, a MAC/IP advertisement route from the second NVE device, and generate a MAC entry based on an ESI and the MAC-VLAN ID that are carried in the MAC/IP advertisement route. The central processing unit 1211 on the main control board 1210 transmits the MAC entry to a forwarding entry memory 1234 on the interface board 1230 using the central processing unit 1231 on the interface board 1230.

The forwarding entry memory 1234 on the interface board 1230 is configured to store the MAC entry. The central processing unit 1231 on the interface board 1230 is configured to control a network memory 1232 to obtain the MAC entry in the forwarding entry memory 1234. In addition, the central processing unit 1231 is configured to control the network memory 1232 to receive and send traffic using the physical interface card 1233.

It should be understood that an operation on the interface board 1240 is consistent with an operation on the interface board 1230 in this embodiment of this application. For brevity, details are not described again. It should be understood that the first NVE device 1200 in this embodiment may correspondingly implement functions of the first NVE device and/or steps performed by the first NVE device in the foregoing method embodiment. For brevity, details are not described herein again. In addition, only the first NVE device is used as an example for a description of this embodiment. It should be understood that the second NVE device, the third NVE device, or more NVE devices have same functions as the first NVE device. Details are not described herein again.

In addition, it should be noted that there may be one or more main control boards. When there are a plurality of main control boards, a primary main control board and a secondary main control board may be included. There may be one or more interface boards, and a stronger data processing capability of the first NVE device indicates a larger quantity of provided interface boards. There may be one or more physical interface cards on the interface board. There may be no switching board, or there may be one or more switching boards. When there are a plurality of switching boards, load sharing and redundancy backup may be jointly implemented. In a centralized forwarding architecture, the first NVE device may not need a switching board, and the interface board bears a service data processing function in an entire system. In a distributed forwarding architecture, the first NVE device may have at least one switching board, and data is exchanged between a plurality of interface boards using the switching board, in order to provide large-capacity data exchanging and processing capability. Therefore, the first NVE device has a better data access and processing capability in the distributed architecture than in the centralized architecture. A specific architecture to be used depends on a specific networking deployment scenario. This is not limited herein.

Figure 14:
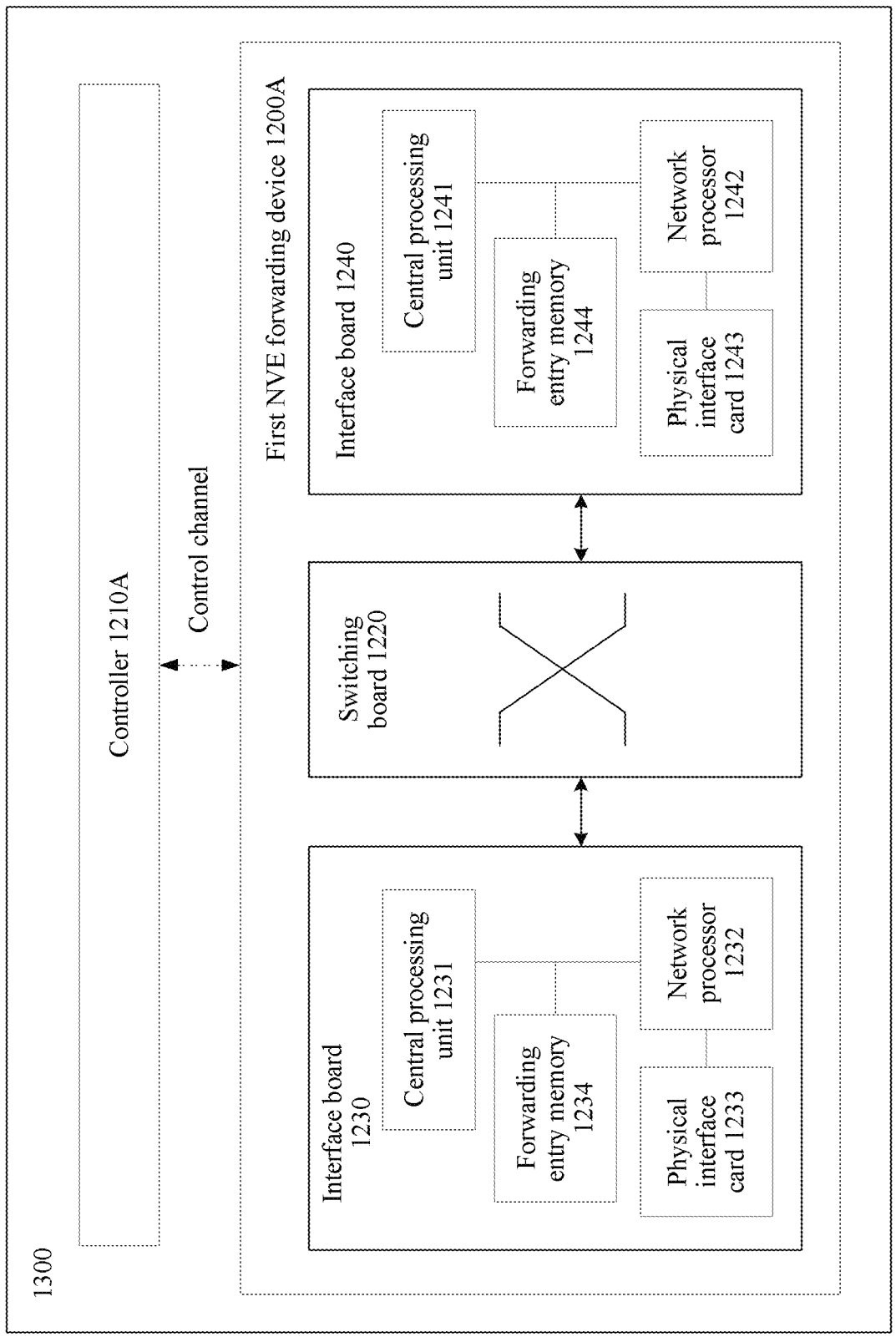
FIG. 14 is a schematic diagram of a hardware structure of still another first NVE device according to an embodiment of this application.

FIG. 14 is a schematic diagram of a hardware structure of still another first NVE device 1300 according to an embodiment of this application. The first NVE device 1300 shown in FIG. 14 may perform corresponding steps performed by the first NVE device in the method in the foregoing embodiment.

This product form of the first NVE device 1300 is applicable to a network architecture (for example, software-defined networking (SDN)) in which control and forwarding are separated. In the SDN, the main control board 1210 of the first NVE device 1200 shown in FIG. 13 is separated from the device, and forms a new independent physical device (that is, a controller 1210A shown in FIG. 14), and remaining components form another independent physical device (that is, a first NVE forwarding device 1200A shown in FIG. 14). The controller 1210A interacts with the first NVE forwarding device 1200A using a control channel protocol. The control channel protocol may be the OpenFlow protocol, the Path Computation Element Communication Protocol (PCEP), the BGP, the Interface to the Routing System (I2RS), or the like. In other words, compared with the embodiment corresponding to FIG. 13, the first NVE device 1300 in this embodiment includes the controller 1210A separated from the device and the first NVE forwarding device 1200A. That is, in this embodiment, the first NVE device 1300 may also be considered as a system.

The controller 1210A may be implemented based on a general-purpose physical server or a dedicated hardware structure. In a design example, the controller includes a receiver, a processor, a transmitter, a RAM, a ROM, and a bus (not shown in the figure). The processor is separately coupled to the receiver, the transmitter, the RAM, and the ROM using the bus. When the controller needs to be run, a BIOS or a bootloader in an embedded system that is built into the ROM is used to lead a system to start, and lead the controller to enter a normal running state. After entering the normal running state, the controller runs an application program and an operating system in the RAM, such that the processor performs all functions and steps of the main control board 1210 in FIG. 13.

The first NVE forwarding device 1200A may be implemented based on a dedicated hardware structure. Functions and structures of the first NVE forwarding device 1200A remain the same as functions and structures of the interface board 1230, the interface board 1240, and the switching board 1220 in FIG. 13, in order to perform a corresponding function and step. Alternatively, the first NVE forwarding device 1200A may be a virtual first NVE forwarding device implemented based on a general-purpose physical server and a network functions virtualization (NFV) technology, and the virtual first NVE forwarding device is a virtual router. In a scenario of the virtual first NVE forwarding device, the interface board, the switching board, and the processor included in the first NVE forwarding device mentioned in the embodiment of the physical first NVE forwarding device may be considered, in a virtual environment, as an interface resource, a network resource, and a processing resource that are allocated by the first NVE forwarding device to the virtual first NVE forwarding device based on the general-purpose physical server. For an implementation of implementing functions or steps of the first forwarding NVE device using the general physical server, or implementing functions or steps of the first forwarding NVE device using the general physical server and the NFV technology, refer to the embodiment in FIG. 12.

It should be understood that in this embodiment, the controller 1210A and the first NVE forwarding device 1200A in the first NVE device 1300 may implement various functions and steps implemented by the first NVE device in the method embodiment. For brevity, details are not described herein again. In addition, only the first NVE device is used as an example for a description of this embodiment. It should be understood that the second NVE device, the third NVE device, or more NVE devices have same functions as the first NVE device. Details are not described herein again.

In addition, an embodiment of this application provides a computer storage medium, configured to store a computer software instruction used by the first NVE device, and the computer software instruction includes a program designed for performing the foregoing method embodiment.

As shown in FIG. 1, an embodiment of this application further includes a network system for processing a route. The network system includes at least two network virtualization edge NVE devices, and each of the at least two NVE devices is the first NVE device in FIG. 11, FIG. 12, FIG. 13, or FIG. 14.

Method or algorithm steps described in combination with the content disclosed in this application may be implemented by hardware, or may be implemented by a processor by executing a software instruction. The software instruction may include a corresponding software module. The software module may be located in a RAM memory, a flash memory, a ROM memory, an erasable programmable ROM (EPROM) memory, an electrically erasable (EEPROM) memory, a register, a hard disk, a removable hard disk, a compact disc ROM (CD-ROM), or a storage medium of any other form known in the art. For example, a storage medium is coupled to a processor, such that the processor can read information from the storage medium or write information into the storage medium. Certainly, the storage medium may be a component of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing embodiments, the objectives, technical solutions, and beneficial effects of this application have been described in more detail. It should be understood that the foregoing descriptions are merely example implementations of this application.

What is claimed is:

1. A route processing method applied to an Ethernet virtual private network (EVPN) comprising a first network device and a second network device, wherein the route processing method comprises:
   receiving, by the first network device, a second EVPN route from the second network device, wherein the second EVPN route comprises a second common tunnel endpoint (TEP) address and a second TEP address; and
   establishing, by the first network device in response to the second common TEP address being the same as a first common TEP address stored in the first network device, a first Network Virtualization over Layer 3 (NVO3) tunnel from the first network device to the second network device based on the second TEP address in the second EVPN route.

2. The route processing method according to claim 1, further comprising sending, by the first network device, a first EVPN route to the second network device, wherein the first EVPN route comprises the first common TEP address and a first TEP address, and wherein the first TEP address is for the second network device to establish a second NVO3 tunnel from the second network device to the first network device.

3. The route processing method according to claim 2, wherein the second NVO3 tunnel comprises a provider edge (PE) device, and wherein the route processing method further comprises:
  sending, by the first network device, the first EVPN route to the PE device;
  receiving, by the first network device, a third EVPN route from the PE device, wherein the third EVPN route comprises a third TEP address of the PE device; and
  establishing, by the first network device, a third NVO3 tunnel from the first network device to the PE device based on the third TEP address of the PE device.

4. The route processing method according to claim 2, wherein a customer edge (CE) device is dual-homed to the first network device and the second network device using a plurality of Ethernet links, wherein the Ethernet links form an Ethernet segment (ES), and wherein the route processing method further comprises:
  determining, by the first network device, the first network device as a designated forwarder (DF) in the ES based on an ES route from the second network device;
  sending, by the first network device, an Ethernet Auto-Discovery (A-D) per ES route to the second network device, wherein the Ethernet A-D per ES route carries an ES identifier (ESI) label allocated by the first network device to an Ethernet link between the CE device and the first network device;
  receiving, by the first network device through the second NVO3 tunnel, an NVO3 packet from the second network device, wherein an original Ethernet payload in the NVO3 packet comprises broadcast, unknown unicast, and multicast (BUM) traffic, wherein the NVO3 packet carries the ESI label, and wherein the BUM traffic is from the CE device; and
  avoiding, by the first network device based on the NVO3 packet, from forwarding the BUM traffic to the CE device using the ES between the CE device and the first network device.

5. The route processing method according to claim 1, wherein the EVPN further comprises a third network device, and wherein the route processing method further comprises:
  receiving, by the first network device, a third EVPN route from the third network device, wherein the third EVPN route comprises a third common TEP address and a third TEP address; and
  establishing, by the first network device in response to the third common TEP address being the same as the first common TEP address stored in the first network device, a third NVO3 tunnel from the first network device to the third network device based on the third TEP address.

6. The route processing method according to claim 5, wherein a customer edge (CE) device is multi-homed to the first network device, the second network device, and the third network device using a plurality of Ethernet links, wherein the Ethernet links form an Ethernet segment (ES), and wherein the route processing method further comprises determining, by the first network device, the first network device as a designated forwarder (DF) in the ES based on ES routes from the second network device and the third network device.

7. The route processing method according to claim 5, further comprising:
  receiving, by the first network device through a second NVO3 tunnel from the second network device to the first network device, broadcast, unknown unicast, and multicast (BUM) traffic from the second network device; and
  avoiding, by the first network device, from forwarding the BUM traffic to the third network device through the third NVO3 tunnel, based on the BUM traffic being received by the first network device through the second NVO3 tunnel.

8. The route processing method according to claim 1, wherein a customer edge (CE) device is dual-homed to the first network device and the second network device using a plurality of Ethernet links, wherein the Ethernet links form an Ethernet segment (ES), and wherein the route processing method further comprises:
  receiving, by the first network device, a media access control/Internet Protocol (MAC/IP) advertisement route from the second network device, wherein the MAC/IP advertisement route comprises a media access control-virtual local area network (MAC-VLAN) identifier (ID), wherein the MAC-VLAN ID indicates a virtual local area network (VLAN) to which a MAC address carried in the MAC/IP advertisement route belongs, and wherein the MAC address is of the CE device or of a host in an EVPN site administered by the CE device;
  determining, by the first network device based on an ES identifier (ESI) and the MAC-VLAN ID, a first local interface that is of the first network device and that connects to an Ethernet link between the CE device and the first network device, wherein the ESI indicates the ES between the CE device and the second network device; and
  sending, by a control plane of the first network device, a first MAC entry to a forwarding plane of the first network device, wherein a first outbound interface in the first MAC entry is the first local interface of the first network device, and wherein the first MAC entry comprises the MAC address and the MAC-VLAN ID.

9. The route processing method according to claim 8, wherein the MAC/IP advertisement route is carried in multiprotocol reachable network layer reachability information (MP_REACH_NLRI), wherein a next hop field in the MP_REACH_NLRI comprises a third common TEP address, wherein the MAC/IP advertisement route further comprises the second TEP address, wherein the route processing method further comprises sending, by the control plane of the first network device, a second MAC entry to the forwarding plane of the first network device based on the third common TEP address and the second TEP address, wherein a second outbound interface in the second MAC entry is a second local interface that is of the first network device and that connects to the first NVO3 tunnel, and wherein the second MAC entry comprises the MAC address carried in the MAC/IP advertisement route.

10. The route processing method according to claim 1, wherein a customer edge (CE) device is connected to the second network device, and wherein the route processing method further comprises:
  receiving, by the first network device, a media access control/Internet Protocol (MAC/IP) advertisement route from the second network device, wherein the MAC/IP advertisement route is carried in multiprotocol reachable network layer reachability information (MP_REACH_NLRI), wherein a next hop field in the MP_REACH_NLRI comprises a third common TEP address, wherein the MAC/IP advertisement route comprises a MAC-virtual local area network (VLAN)

identifier (ID) and the second TEP address, wherein the MAC-VLAN ID indicates a VLAN to which a MAC address carried in the MAC/IP advertisement route belongs, and wherein the MAC address is of the CE device or of a host in an EVPN site administered by the CE device;

determining, by the first network device based on an Ethernet Segment (ES) identifier (ESI) and the MAC-VLAN ID, that the first network device has no local interface that connects to an Ethernet link between the CE device and the first network device, wherein the ESI indicates an ES between the CE device and the second network device; and sending, by a control plane of the first network device, a MAC entry to a forwarding plane of the first network device based on the third common TEP address and the second TEP address, wherein an outbound interface in the MAC entry is a local interface that is of the first network device and that connects to the first NVO3 tunnel, and wherein the MAC entry comprises the MAC address.

11. The route processing method according to claim 1, wherein the second EVPN route is an inclusive multicast Ethernet tag (IMET) route.

12. The route processing method according to claim 1, wherein both the first network device and the second network device are network virtualization edges (NVEs).

13. A first network device comprising:
a non-transitory memory configured to store instructions; and
a processor coupled to the non-transitory memory and configured to execute the instructions to cause the first network device to be configured to:
receive a second Ethernet virtual private network (EVPN) route from a second network device, wherein the second EVPN route comprises a second common tunnel endpoint (TEP) address and a second TEP address; and
establish, in response to the second common TEP address being the same as a first common TEP address stored in the first network device, a first Network Virtualization over Layer 3 (NVO3) tunnel from the first network device to the second network device based on the second TEP address in the second EVPN route.

14. The first network device according to claim 13, wherein the instructions, when executed by the processor, further cause the first network device to be configured to send a first EVPN route to the second network device, wherein the first EVPN route carries the first common TEP address and a first TEP address, and wherein the first TEP address is for the second network device to establish a second NVO3 tunnel from the second network device to the first network device.

15. The first network device according to claim 14, wherein the instructions, when executed by the processor, further cause the first network device to be configured to:
send the first EVPN route to a provider edge (PE) device;
receive a third EVPN route from the PE device, wherein the third EVPN route comprises a third TEP address of the PE device; and
establish a third NVO3 tunnel from the first network device to the PE device based on the third TEP address of the PE device.

16. The first network device according to claim 14, wherein a customer edge (CE) device is dual-homed to the first network device and the second network device using a plurality of Ethernet links, wherein the Ethernet links form an Ethernet segment (ES), and wherein the instructions, when executed by the processor, further cause the first network device to be configured to:
determine the first network device as a designated forwarder (DF) in the ES based on an ES route from the second network device;
send an Ethernet Auto-Discovery (A-D) per ES route to the second network device, wherein the Ethernet A-D per ES route carries an Ethernet segment identifier (ESI) label allocated by the first network device to an Ethernet link between the CE device and the first network device;
receive, through the second NVO3 tunnel, a NVO3 packet from the second network device, wherein an original Ethernet payload in the NVO3 packet comprises broadcast, unknown unicast, and multicast (BUM) traffic, wherein the NVO3 packet carries the ESI label, and wherein the BUM traffic is from the CE device; and
avoid, based on the NVO3 packet, from forwarding the BUM traffic to the CE device using the ES between the CE device and the first network device.

17. The first network device according to claim 13, wherein the instructions, when executed by the processor, further cause the first network device to be configured to:
receive a third EVPN route from a third network device, wherein the third EVPN route comprises a third common TEP address and a third TEP address; and
establish, in response to the third common TEP address being the same as the first common TEP address, a third NVO3 tunnel from the first network device to the third network device based on the third TEP address in the third EVPN route.

18. The first network device according to claim 17, wherein a customer edge (CE) device is multi-homed to the first network device, the second network device, and the third network device using a plurality of Ethernet links, wherein the Ethernet links form an Ethernet segment (ES), and wherein the instructions, when executed by the processor, further cause the first network device to be configured to determine the first network device as a designated forwarder (DF) in the ES based on ES routes from the second network device and the third network device.

19. The first network device according to claim 17, wherein the instructions, when executed by the processor, further cause the first network device to be configured to:
receive, through a second NVO3 tunnel from the second network device to the first network device, broadcast, unknown unicast, and multicast (BUM) traffic from the second network device; and
avoid forwarding the BUM traffic to the third network device through the third NVO3, based on the BUM traffic being received by the first network device through the second NVO3 tunnel.

20. The first network device according to claim 13, wherein a customer edge (CE) device is dual-homed to the first network device and the second network device using a plurality of Ethernet links, wherein the Ethernet links form an Ethernet segment (ES), and wherein the instructions, when executed by the processor, further cause the first network device to be configured to:
receive a media access control/Internet Protocol (MAC/IP) advertisement route from the second network device, wherein the MAC/IP advertisement route comprises a media access control-virtual local area network identifier (MAC-VLAN ID), wherein the MAC-VLAN ID indicates a virtual local area network (VLAN) to which a MAC address carried in the MAC/IP advertisement route belongs, and wherein the MAC address is of the CE device or of a host in an EVPN site administered by the CE device;

determine, based on an ES identifier (ESI) and the MAC-VLAN ID that are carried in the MAC/IP advertisement route, a first local interface that is of the first network device and that connects to an Ethernet link between the CE device and the first network device, wherein the ESI indicates the ES between the CE device and the second network device; and trigger sending of a first MAC entry to a forwarding plane of the first network device, wherein an outbound interface in the first MAC entry is the first local interface of the first network device, and wherein the first MAC entry comprises the MAC address and the MAC-VLAN ID.

21. The first network device according to claim 20, wherein the MAC/IP advertisement route is carried in multiprotocol reachable network layer reachability information (MP_REACH_NLRI), wherein a next hop field in the MP_REACH_NLRI comprises a third common TEP address, wherein the MAC/IP advertisement route further comprises the second TEP address, wherein the instructions, when executed by the processor, further cause the first network device to be configured to trigger sending of a second MAC entry to the forwarding plane of the first network device based on the third common TEP address and the second TEP address, wherein a second outbound interface in the second MAC entry is a second local interface that is of the first network device and that connects to the first NVO3 tunnel, and wherein the second MAC entry comprises the MAC address carried in the MAC/IP advertisement route.

22. The first network device according to claim 13, wherein a customer edge (CE) device is connected to the second network device, and wherein the instructions, when executed by the processor, further cause the first network device to be configured to:

receive a media access control (MAC)/IP advertisement route from the second network device, wherein the MAC/IP advertisement route is carried in multiprotocol reachable network layer reachability information (MP_REACH_NLRI), wherein a next hop field in the MP_REACH_NLRI comprises a third common TEP address, wherein the MAC/IP advertisement route comprises a MAC-virtual local area network (VLAN) identifier (ID) and the second TEP address, wherein the MAC-VLAN ID indicates a virtual local area network (VLAN) to which a MAC address carried in the MAC/IP advertisement route belongs, and wherein the MAC address is of the CE device or of a host in an EVPN site administered by the CE device;

determine, based on an Ethernet segment (ES) identifier (ESI) and the MAC-VLAN ID that are carried in the MAC/IP advertisement route, that the first network device has no local interface that connects to an Ethernet link between the CE device and the first network device, wherein the ESI indicates an ES between the CE device and the second network device; and trigger sending of a MAC entry to a forwarding plane of the first network device based on the third common TEP address and the second TEP address, wherein an outbound interface in the MAC entry is a local interface that is of the first network device and that connects to the first NVO3 tunnel, and wherein the MAC entry comprises the MAC address.

23. The first network device according to claim 13, wherein the second EVPN route is an inclusive multicast Ethernet tag (IMET) route.

24. The first network device according to claim 13, wherein both the first network device and the second network device are network virtualization edges (NVEs).

25. A computer program product comprising instructions stored on a non-transitory computer-readable medium that, when executed by a processor, cause a first network device to:

receive a second Ethernet virtual private network (EVPN) route from a second network device, wherein the second EVPN route comprises a second common tunnel endpoint (TEP) address and a second TEP address; and establish, in response to the second common TEP address being the same as a first common TEP address stored in the first network device, a first Network Virtualization over Layer 3 (NVO3) tunnel from the first network device to the second network device based on the second TEP address in the second EVPN route.

26. The computer program product of claim 25, wherein the instructions further cause the first network device to send a first EVPN route to the second network device, wherein the first EVPN route carries the first common TEP address and a first TEP address, and wherein the first TEP address is for the second network device to establish a second NVO3 tunnel from the second network device to the first network device.

* * * * *